(12) United States Patent
Wu et al.

(10) Patent No.: US 11,918,153 B2
(45) Date of Patent: Mar. 5, 2024

(54) FOOD TRANSPORTATION AND HUMIDITY CONTROL ELEMENTS

(71) Applicant: CFA Properties, Inc., Atlanta, GA (US)

(72) Inventors: Andy Wu, Mableton, GA (US); Jason Begin, Roswell, GA (US)

(73) Assignee: CFA PROPERTIES, INC., Atlanta, GA (US)

( * ) Notice: Subject to any disclaimer, the term of this patent is extended or adjusted under 35 U.S.C. 154(b) by 156 days.

(21) Appl. No.: 17/132,733

(22) Filed: Dec. 23, 2020

(65) Prior Publication Data

US 2021/0113029 A1 Apr. 22, 2021

Related U.S. Application Data

(63) Continuation-in-part of application No. 16/722,671, filed on Dec. 20, 2019, which is a
(Continued)

(51) Int. Cl.
*A47J 47/14* (2006.01)
*A47J 36/26* (2006.01)
(Continued)

(52) U.S. Cl.
CPC ............... *A47J 47/14* (2013.01); *A47J 36/26* (2013.01); *A47J 39/003* (2013.01); *B65D 81/26* (2013.01)

(58) Field of Classification Search
CPC .......... A47J 36/26; A47J 39/003; A47J 47/14; B65D 81/26
See application file for complete search history.

(56) References Cited

U.S. PATENT DOCUMENTS 2,411,039 A 11/1946 Heuser
2,853,997 A 9/1958 Scherck
(Continued)

FOREIGN PATENT DOCUMENTS

CN 207 922 672 U 9/2018
CN 112 097 439 A 12/2020
(Continued)

OTHER PUBLICATIONS

WIPO Application No. PCT/IB2019/055276, Invitation to Pay Additional Fees mailed Oct. 22, 2019.
(Continued)

*Primary Examiner* — Michael G Hoang
*Assistant Examiner* — Logan P Jones
(74) *Attorney, Agent, or Firm* — Alston & Bird LLP

(57) ABSTRACT

A food transportation system and associated modular humidity control system are provided. An example system includes a body configured for attachment with a food storage housing. The body defines a closed circuit air flow path for circulating air through the food storage housing. The system also includes a humidity control element secured within the closed circuit air flow path that condenses moisture from the moisture-laden air passing through the closed circuit air flow path. The system further includes a condensation collector configured to receive fluid condensed from the moisture-laden air by the humidity control element.

11 Claims, 18 Drawing Sheets

Related U.S. Application Data continuation-in-part of application No. 16/448,761, filed on Jun. 21, 2019.

(60) Provisional application No. 62/814,002, filed on Mar. 5, 2019, provisional application No. 62/688,209, filed on Jun. 21, 2018.

(51) Int. Cl.
*A47J 39/00* (2006.01)
*B65D 81/26* (2006.01)

(56) References Cited

U.S. PATENT DOCUMENTS

| | | | |
|---|---|---|---|
| 3,034,221 A | | 5/1962 | Tuck |
| 3,142,830 A | | 7/1964 | Patrick |
| 3,826,957 A | * | 7/1974 | McLaughlin ......... H01L 23/427 |
| | | | 257/688 |
| 3,997,978 A | | 12/1976 | Stuckey |
| 4,255,937 A | | 3/1981 | Ehrlich |
| 4,430,989 A | | 2/1984 | Narang |
| 4,471,537 A | * | 9/1984 | Meda ..................... A23N 12/08 |
| | | | 34/225 |
| 4,478,784 A | * | 10/1984 | Burelbach ................ G21C 1/03 |
| | | | 165/274 |
| 4,529,420 A | | 7/1985 | Norbäck |
| 4,730,100 A | | 3/1988 | Pingelton |
| 4,922,626 A | | 5/1990 | Fiddler |
| 4,926,618 A | | 5/1990 | Ratliff |
| 5,022,167 A | | 6/1991 | Nakamura |
| 5,152,077 A | * | 10/1992 | Liang ....................... F26B 9/06 |
| | | | 34/524 |
| 5,343,632 A | * | 9/1994 | Dinh ..................... F26B 21/086 |
| | | | 34/507 |
| 5,493,874 A | | 2/1996 | Landgrebe |
| 5,676,051 A | * | 10/1997 | Sinemus ................ A47J 39/003 |
| | | | 99/476 |
| 6,110,261 A | | 8/2000 | Guiragossian |
| 6,672,301 B2 | | 1/2004 | Delzanno et al. |
| 7,009,147 B1 | | 3/2006 | Schulte |
| 8,011,205 B2 | | 9/2011 | Roth et al. |
| 8,247,097 B1 | | 8/2012 | Duff |
| 9,492,035 B2 | | 11/2016 | Pavel et al. |
| 10,035,632 B2 | | 7/2018 | Birgen et al. |
| 2009/0025704 A1 | | 1/2009 | Padula |
| 2009/0049843 A1 | * | 2/2009 | Albayrak ................ F25B 21/02 |
| | | | 62/3.3 |
| 2009/0277202 A1 | | 11/2009 | Viegas |
| 2011/0283554 A1 | | 11/2011 | Kuhnau |
| 2013/0067661 A1 | | 3/2013 | Schwirian et al. |
| 2015/0297029 A1 | | 10/2015 | Smith |
| 2015/0329265 A1 | | 11/2015 | Birgen |
| 2016/0195287 A1 | | 7/2016 | Shirali et al. |
| 2017/0261237 A1 | | 9/2017 | High et al. |
| 2017/0265687 A1 | | 9/2017 | Veltrop et al. |
| 2018/0273275 A1 | | 9/2018 | Birgen |
| 2019/0112119 A1 | | 4/2019 | Alexander |
| 2019/0133412 A1 | * | 5/2019 | Hofmann ............. A47L 15/4225 |
| 2019/0390906 A1 | | 12/2019 | Wu et al. |

FOREIGN PATENT DOCUMENTS

| | | | | |
|---|---|---|---|---|
| DE | 1979810 U | | 2/1968 | |
| DE | 3134506 A1 | * | 3/1983 | |
| EP | 2072109 A1 | | 6/2009 | |
| FR | 1368101 A | | 6/1964 | |
| JP | H08196796 A | * | 8/1996 | |
| JP | H0975048 A | | 3/1997 | |
| JP | 2001-122342 A | | 5/2001 | |
| JP | 2002-106889 | | 4/2002 | |
| WO | WO 02/073110 A1 | | 9/2002 | |
| WO | WO-2011000705 A1 | * | 1/2011 | ........... D06F 58/206 |
| WO | WO 2019/244131 A2 | | 12/2019 | |

OTHER PUBLICATIONS

WIPO Application No. PCT/IB2019/055276, PCT International Search Report and Written Opinion of the International Searching Authority dated Dec. 18, 2019.

WIPO Application No. PCT/IB2021/062117, PCT International Search Report and Written Opinion of the International Searching Authority dated Apr. 4, 2022.

Notice of Allowance and Fee(s) Due for U.S. Appl. No. 16/448,761, dated Jan. 11, 2023, (18 pages), United States Patent and Trademark Office, US.

International Preliminary Report on Patentability Under Chapter I for International Application No. PCT/IB2021/062117, dated Jul. 6, 2023, (8 pages), The International Bureau of WIPO, Geneva, Switzerland.

* cited by examiner

FOOD TRANSPORTATION AND HUMIDITY CONTROL ELEMENTS

CROSS-REFERENCE TO RELATED APPLICATIONS

This application is a continuation-in-part application of U.S. patent application Ser. No. 16/722,671, filed Dec. 20, 2019, which application is a continuation-in-part application of U.S. patent application Ser. No. 16/448,761, filed Jun. 21, 2019, which application claims priority to U.S. Provisional Application No. 62/688,209, filed Jun. 21, 2018, and U.S. Provisional Application No. 62/814,002, filed Mar. 5, 2019, the contents of which applications are incorporated by reference herein in their entirety.

BACKGROUND

The food service industry relies upon quickly providing customers with freshly prepared food items. This goal is relatively straight-forward when a customer orders a food item at a food service establishment given the relatively short time between preparing the food item and consumption by the customer. To provide food items to customers at locations other than the establishment however (e.g., via catering services, delivery services to satellite locations, etc.), many food service establishments prepare certain food items and transport these items to customers at the other locations. By way of example, some food service companies maintain establishments that may not contain the necessary equipment to prepare the food on-site (e.g., food trucks, festival booths, pop-up stores, or the like) and/or provide catering services in which the food items must be previously-prepared.

As such, food delivery services are often looking for ways to ensure that these previously-prepared food items still taste fresh when ultimately served to customers at another location. Due to the substantial amount of transit time often incurred when transporting previously-prepared food items, food items are frequently delivered that are soggy or otherwise unappealing to the customer. As such, a need exists for providing a desirable food storage environment during the delivery process such that the customer receives a fresh item upon delivery.

BRIEF SUMMARY

Example embodiments of the present disclosure are directed to food transportation systems and associated modular humidity control systems. An example food transportation system includes a food storage housing defining an interior configured to house one or more food items. The food transportation system may further include a modular humidity control system that includes a body attached to the food storage housing defining a closed circuit air flow path for circulating air through the food storage housing (e.g., forced air circulation). The modular humidity control system may include a humidity control element secured within the closed circuit air flow path and configured to condense moisture from the moisture-laden air passing through the closed circuit air flow path. The modular humidity control system may also include a condensation collector configured to receive fluid condensed from the moisture-laden air by the humidity control element.

In some embodiments, the food transportation system may include one or more fluid sensors coupled to the condensation collector that generate condensation data indicative of the fluid level within the condensation collector.

In some embodiments, the body is further configured for removable attachment to an external surface of the food storage housing.

In some embodiments, the condensation collector is configured to house the humidity control element therein. In such an embodiment, the humidity control element may include a frozen fluid. In other embodiments, the humidity control element may include a desiccant material. In other embodiments, the humidity control element may include a Peltier dehumidification element or plate.

In some embodiments, the food transportation system may include a heating system configured to heat air within the interior of the housing.

In other embodiments, the food transportation system may include one or more fans configured to cause moisture-laden air to circulate in the closed circuit air flow path. In such an embodiment, the housing may define an access door movable between an open configuration and a closed configuration and configured to enable access to the interior of the housing while in the open configuration.

In a further embodiment, the food transportation system may also include a detection system attached to the housing and configured to indicate the position of the access door.

In a still further embodiment, the food transportation system may further include a controller communicably coupled with the one or more fans and the detection system. The controller may be configured to: receive detection data from the detection system; determine the position of the access door based upon the detection data; and, in an instance in which the access door is determined to be in the open position, halt operation of the one or more fans.

In some embodiments, the food transportation system may include one or more temperature sensors configured to identify a temperature within the interior of the housing. The controller may be configured to, based upon the temperature, vary a speed of the one or more fans so as to modify the temperature within the housing.

In some embodiments, the food transportation system may include a high heat system including a plurality of film heating elements positioned within interior of the housing. In such an embodiment, the high heat system may further include a perforated grill configured to enclose the plurality of film heating elements so as to divide the interior of the housing into heating areas.

BRIEF DESCRIPTION OF THE SEVERAL VIEWS OF THE DRAWINGS

Figure 1:
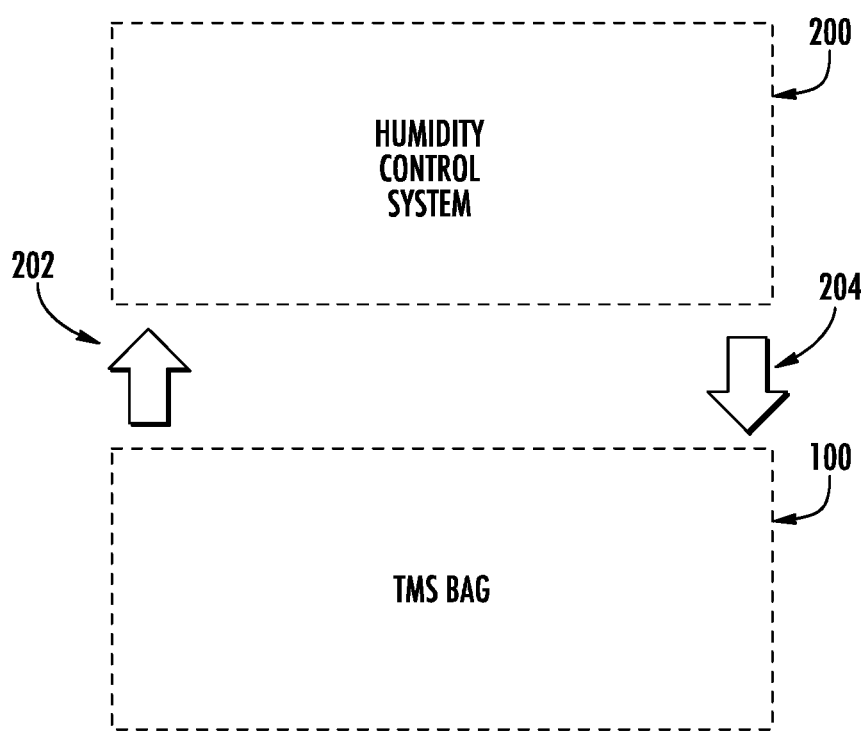

Having thus described the invention in general terms, reference will now be made to the accompanying drawings, which are not necessarily drawn to scale, and wherein:

FIG. 1 illustrates a schematic representation of a modular humidity control system according to various embodiments.

Figure 2:
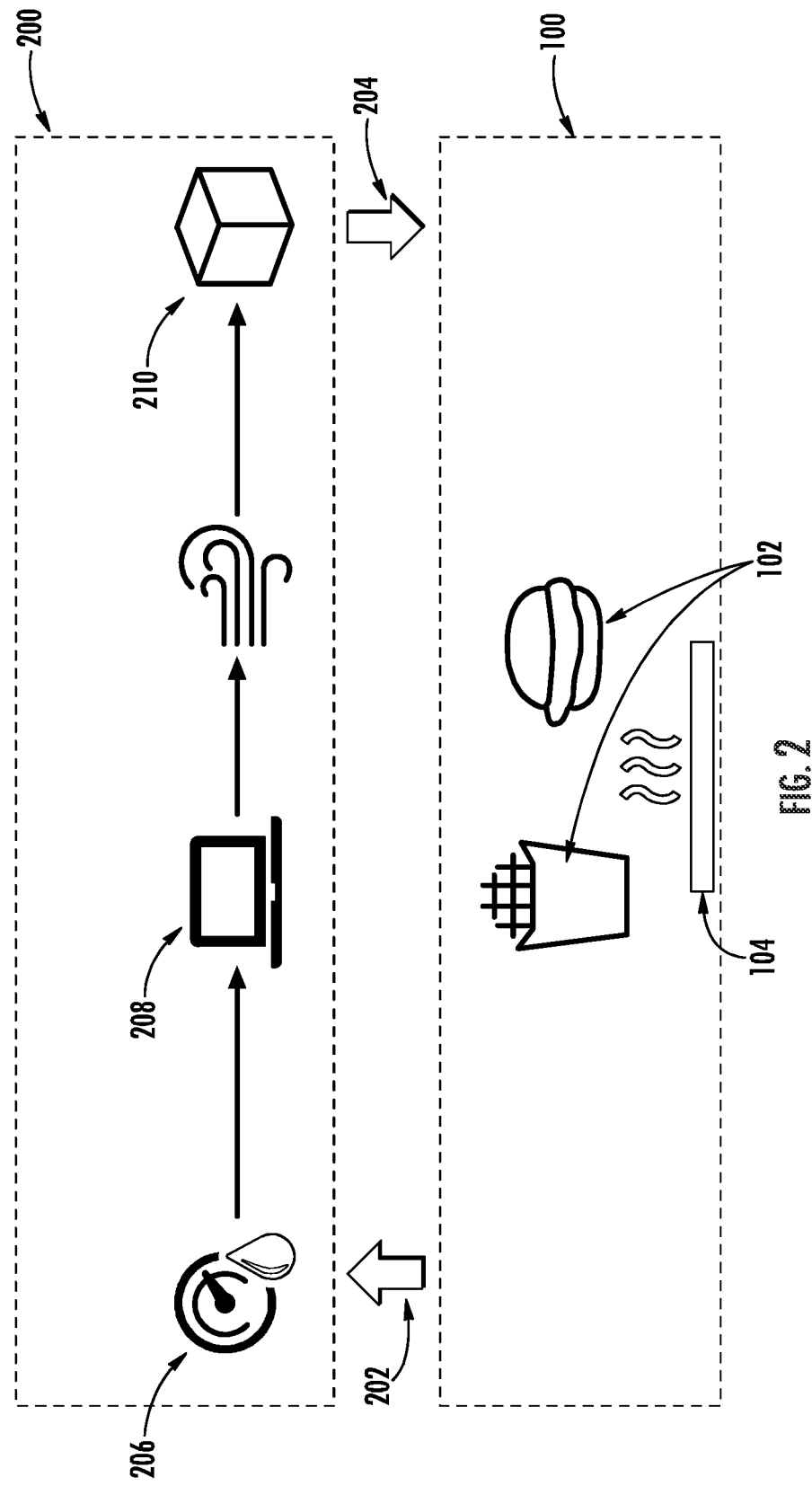

FIG. 2 illustrates the modular humidity control system of FIG. 1 including various components supported therein according to an example embodiment.

Figure 3:
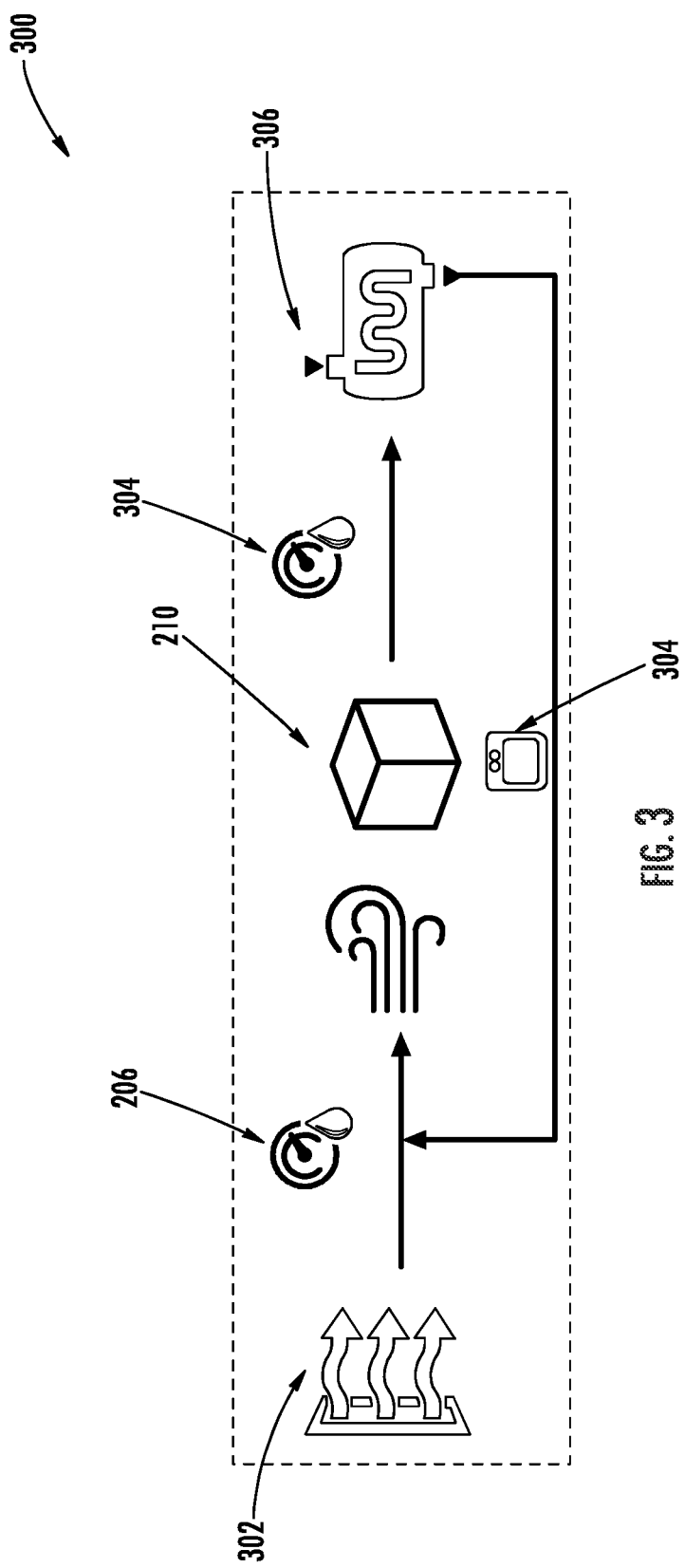

FIG. 3 illustrates a regeneration system for the modular humidity control system of FIG. 1 according to an example embodiment.

Figure 4:
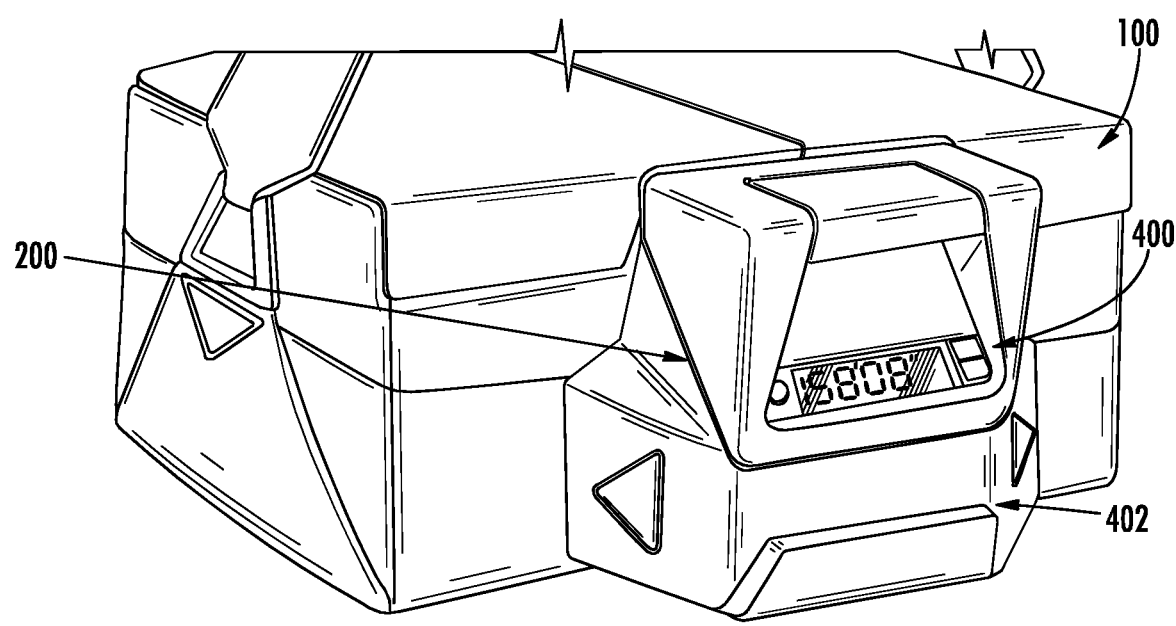

FIG. 4 illustrates an example modular humidity control system and display attached to a temperature management system (TMS) according to an example embodiment.

Figure 5:
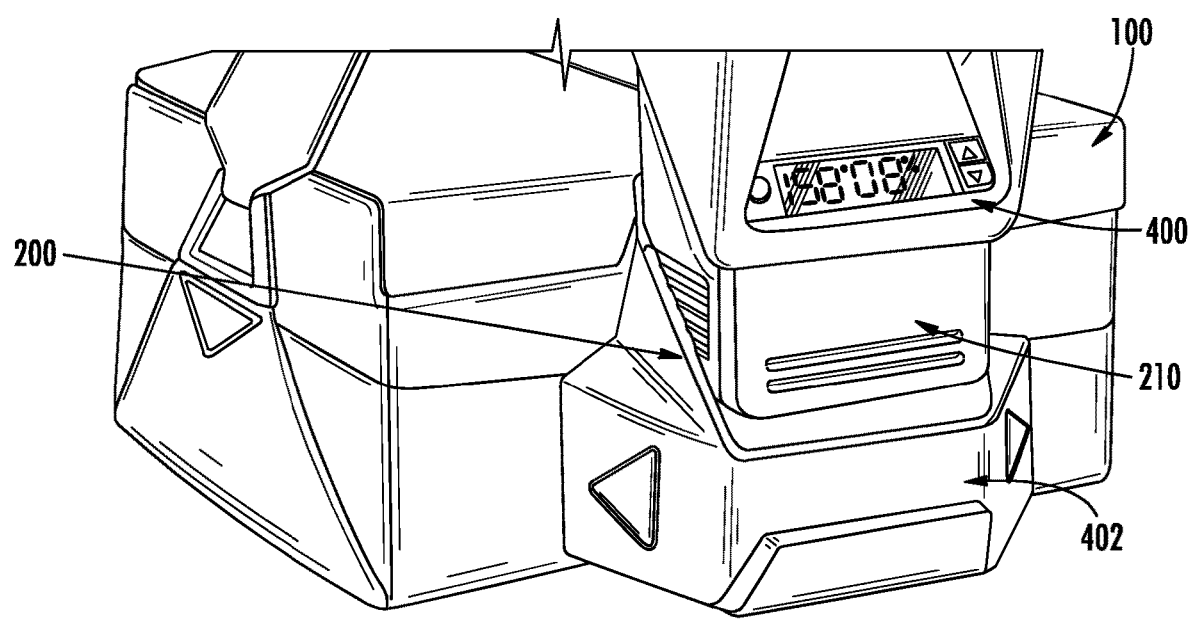

FIG. 5 illustrates the modular humidity control system of FIG. 4 and desiccant element according to an example embodiment.

Figure 6A:
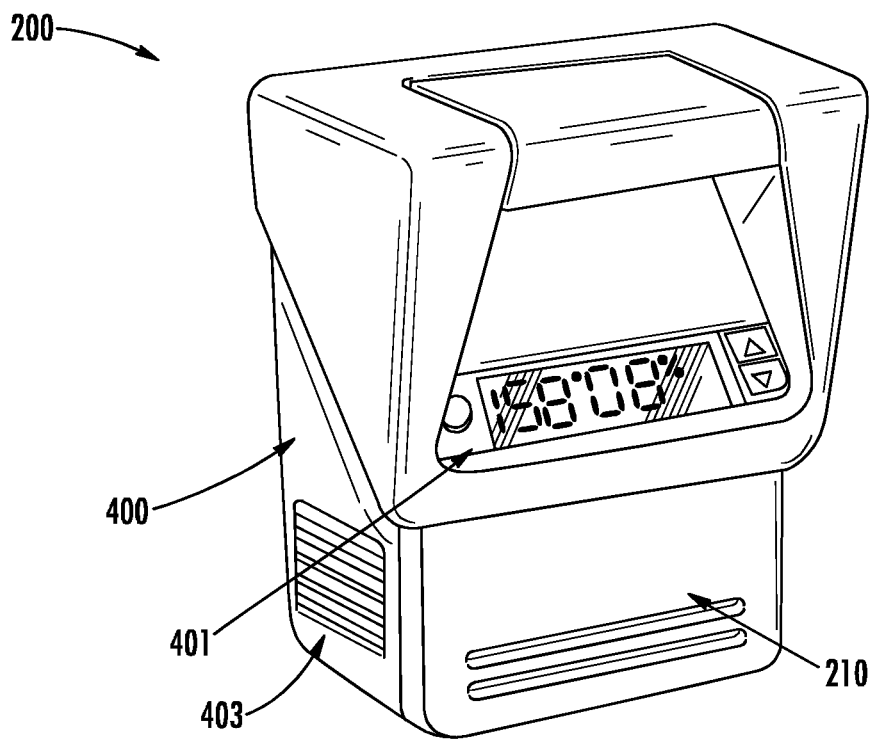
Figure 6B:
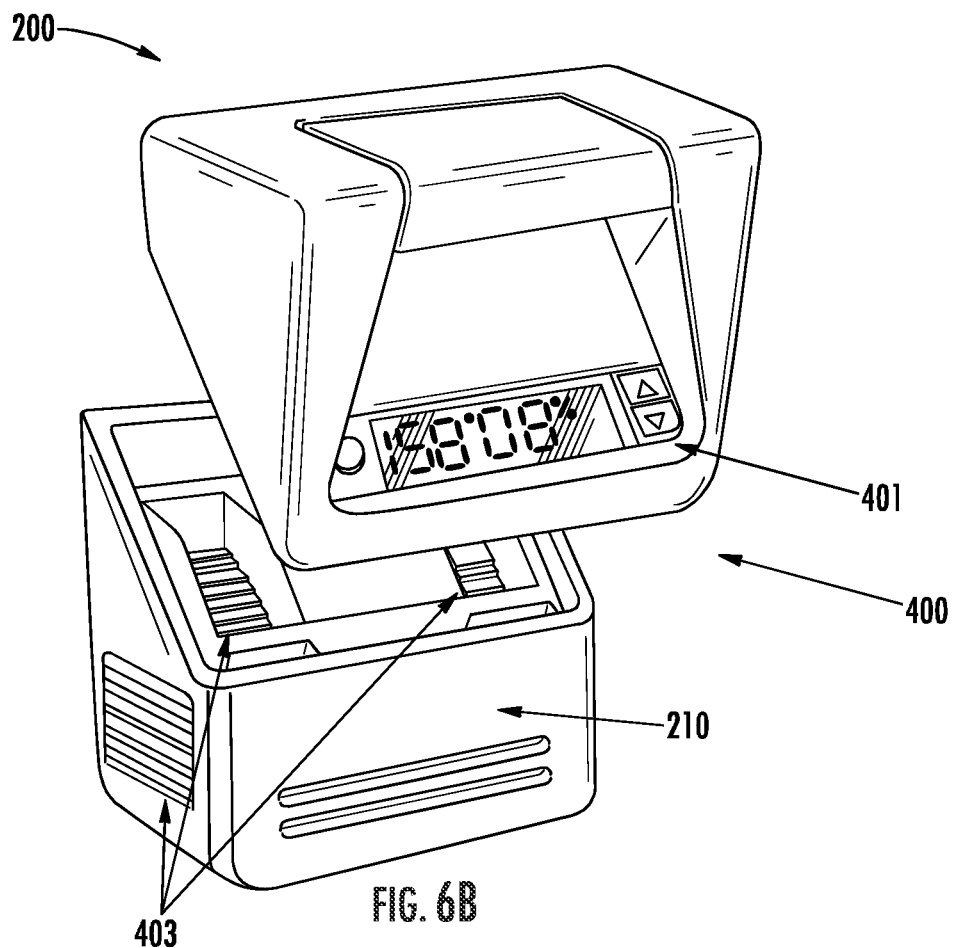

FIGS. 6A-6B illustrate the modular humidity control system and display of FIG. 4 detached from the TMS system and the display detached from the modular humidity control system, respectively, according to an example embodiment.

Figure 7:
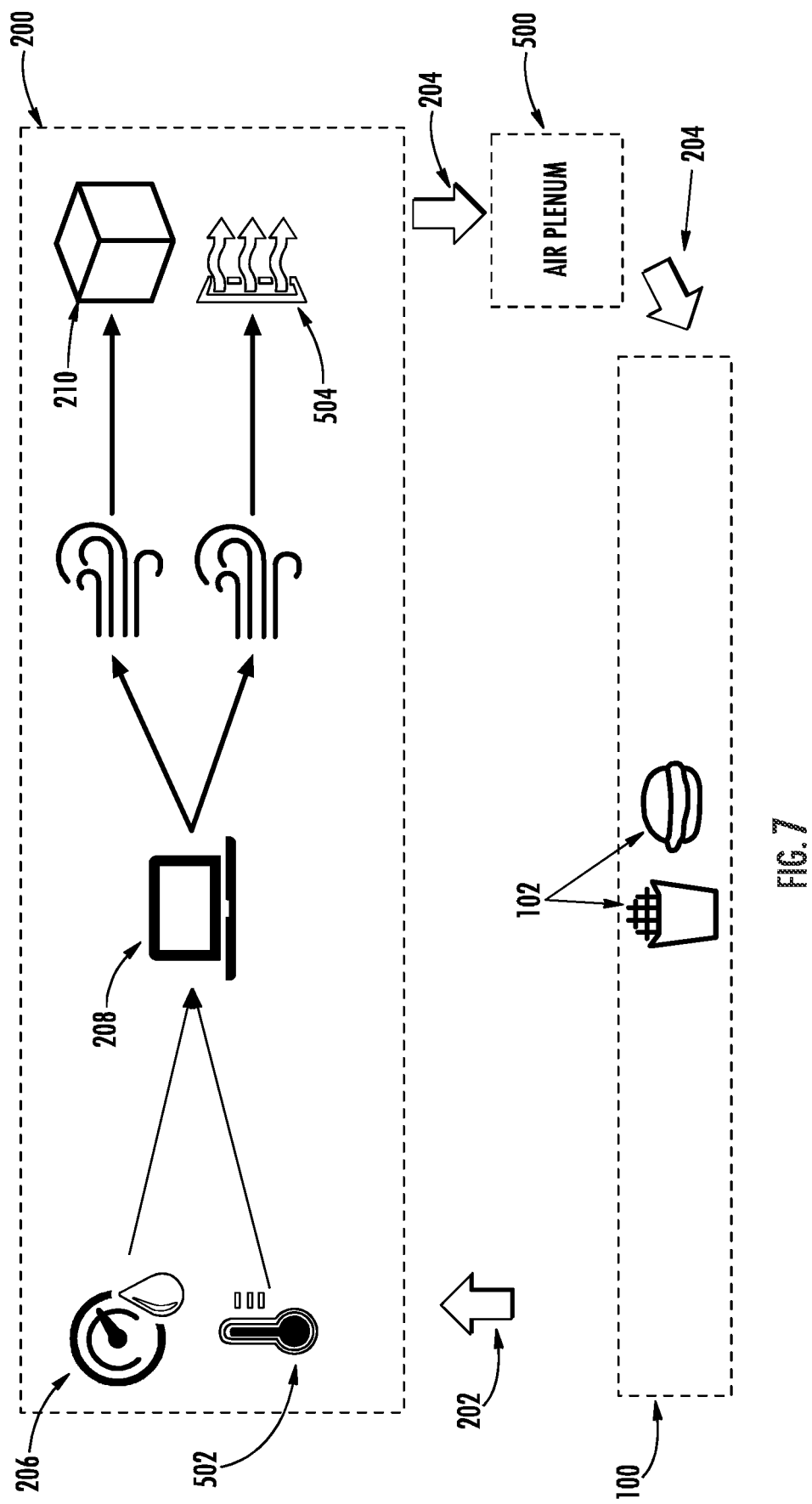

FIG. 7 illustrates a schematic representation of a modular humidity control system including heat preservation according to an example embodiment.

Figure 8A:
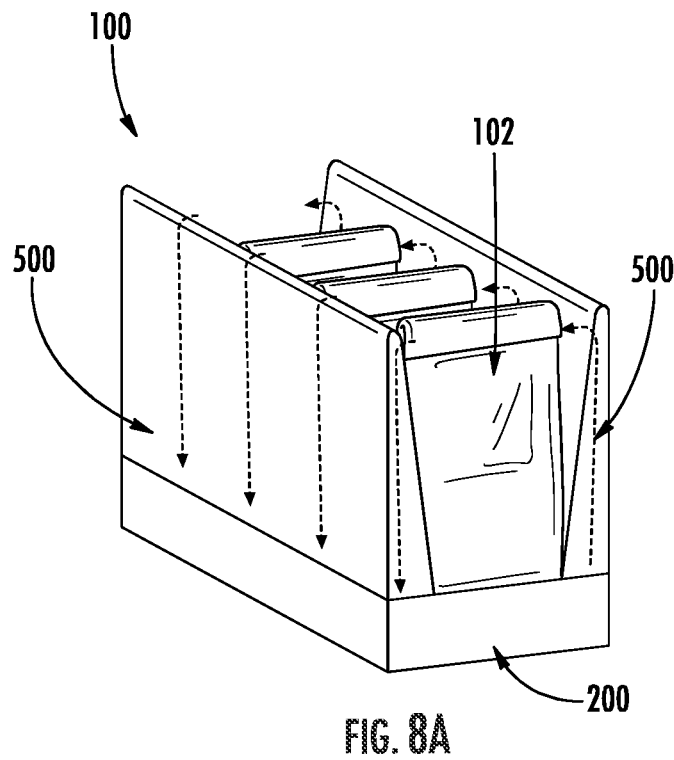
Figure 8B:
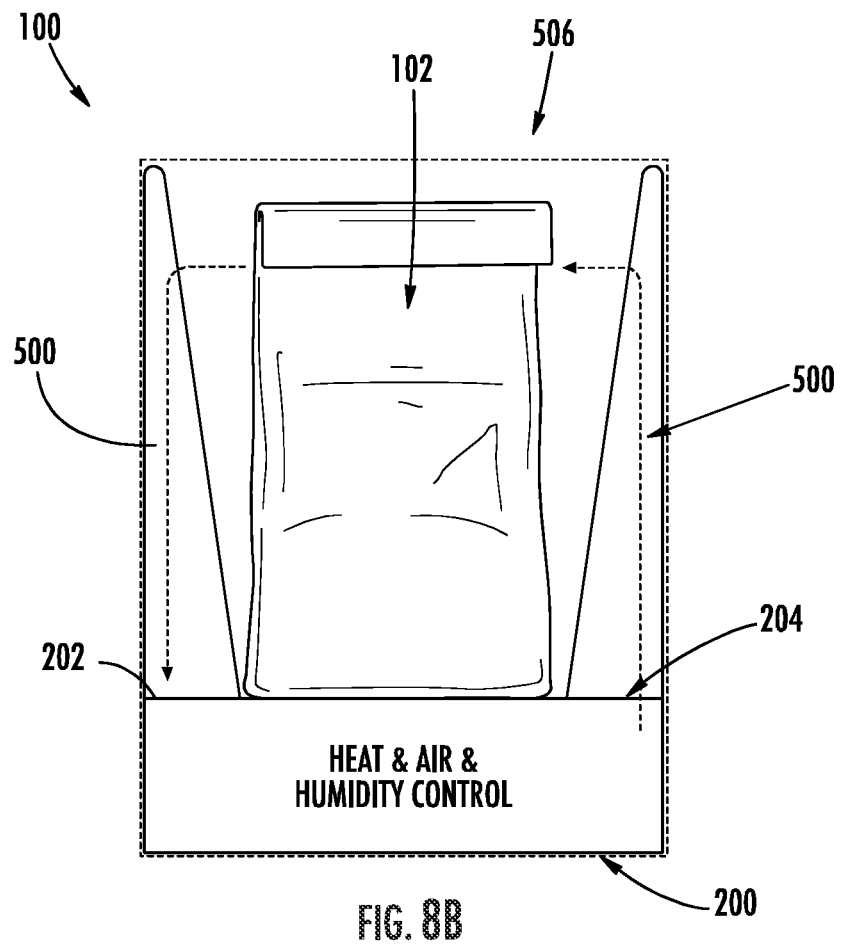

FIGS. 8A-8B illustrate a perspective and a cross-sectional side view, respectively, of the modular humidity control system with heat preservation of FIG. 7 according to an example embodiment.

Figure 9:
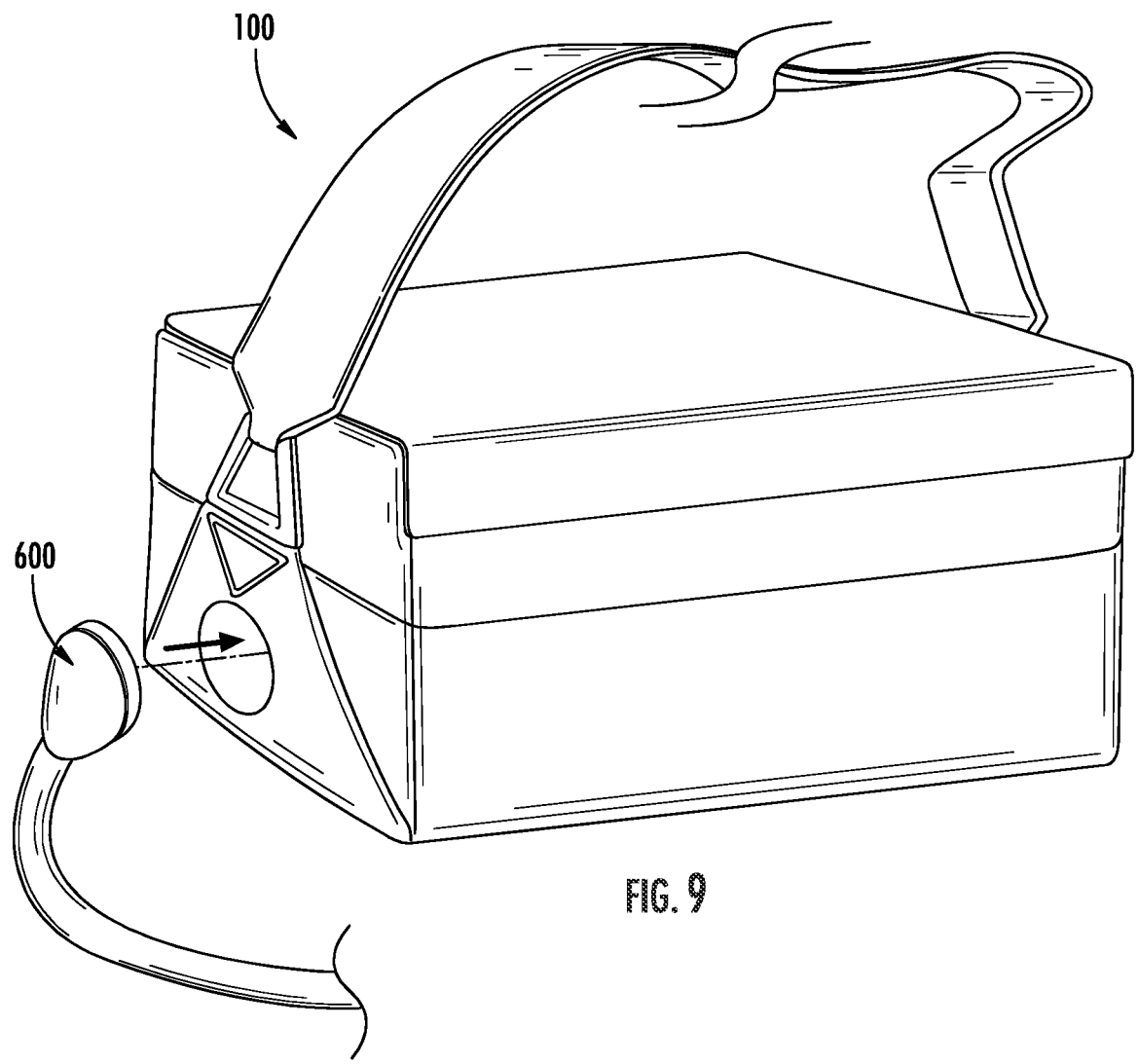

FIG. 9 illustrates an example umbilical connection system for use with the modular humidity control system embodiments described herein.

Figure 10:
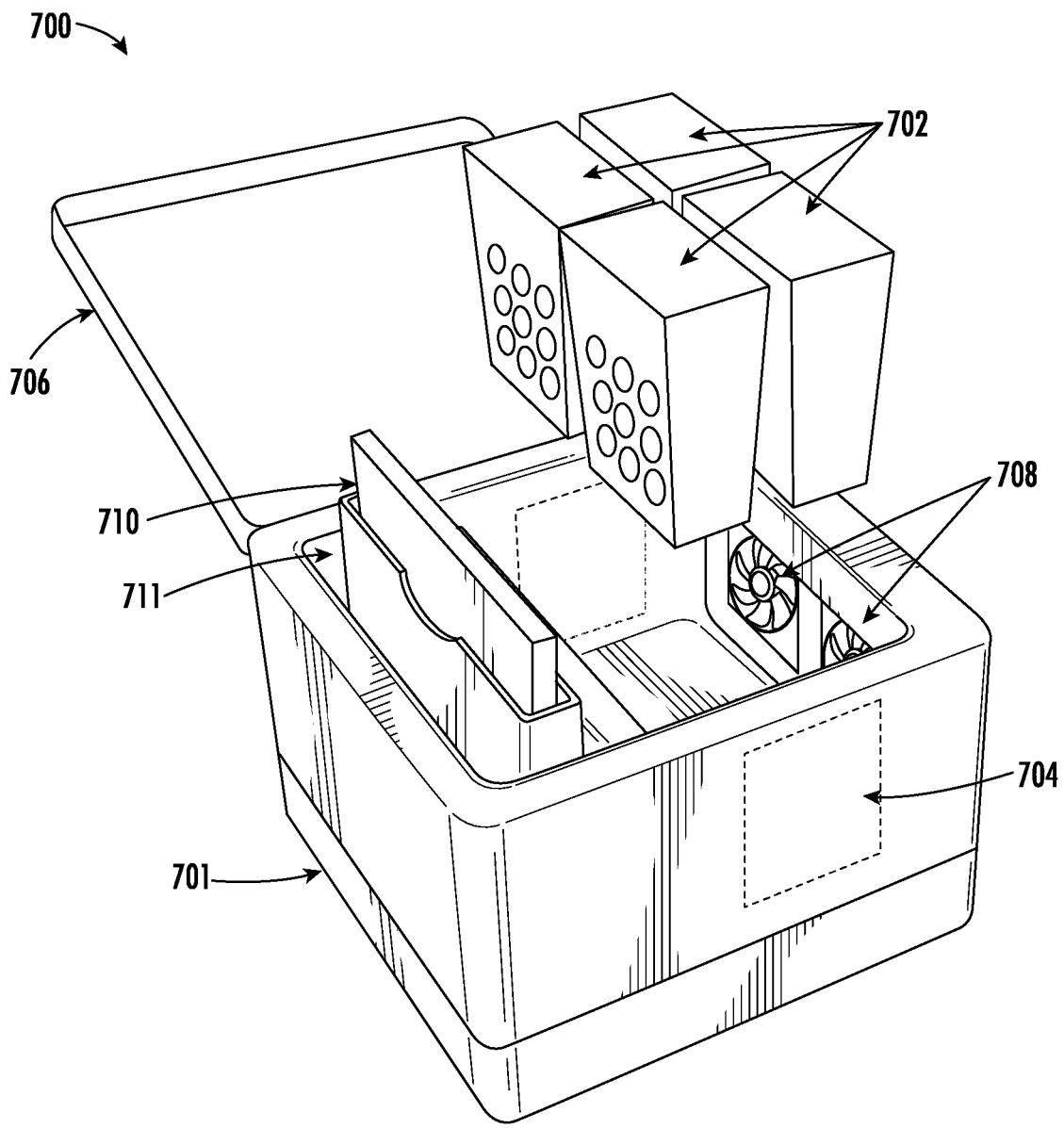

FIG. 10 illustrates an example food transportation system according to an example embodiment.

Figure 11:
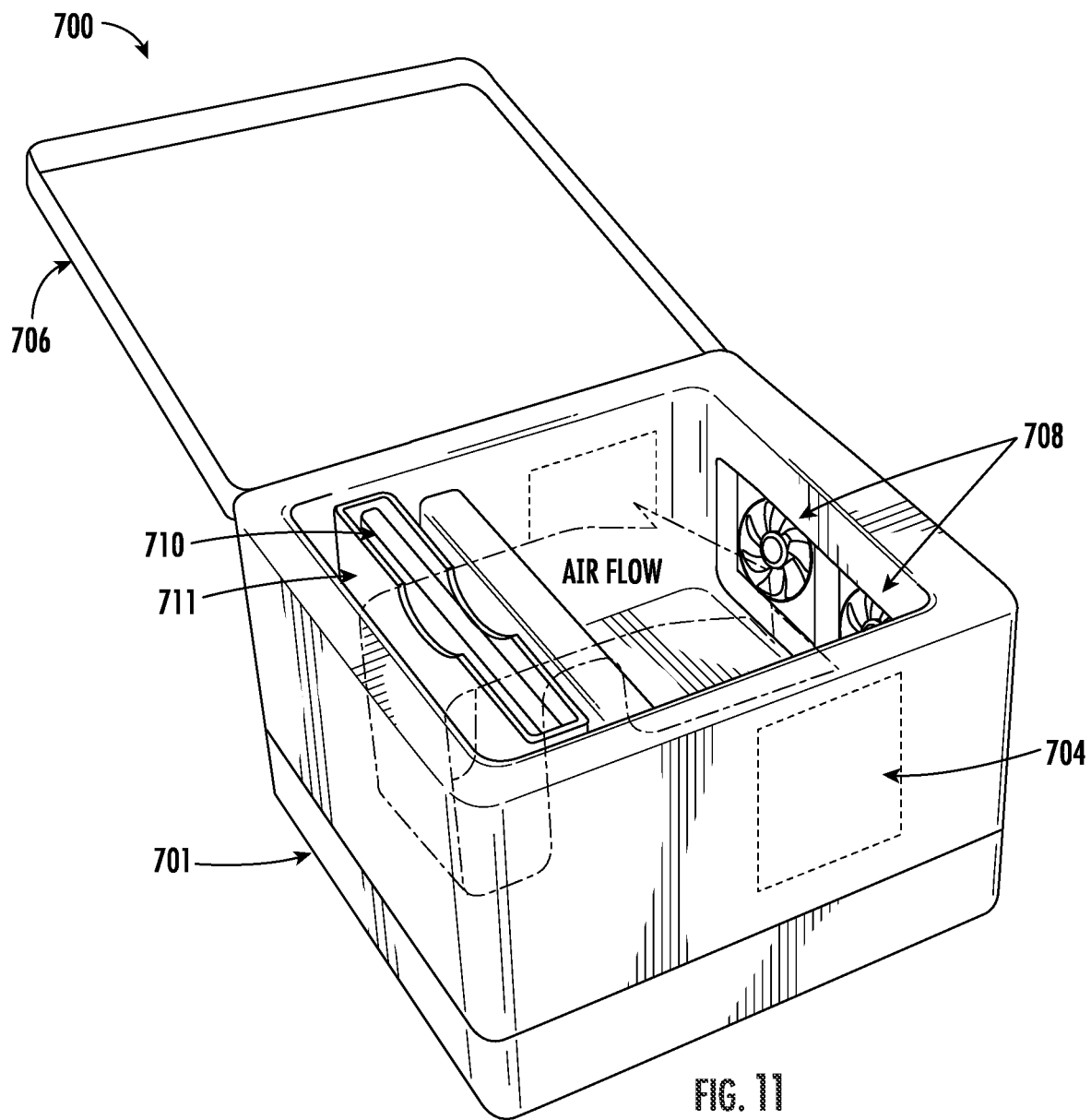

FIG. 11 illustrates an air circulation path of the food transportation system of FIG. 10 according to an example embodiment.

Figure 12A:
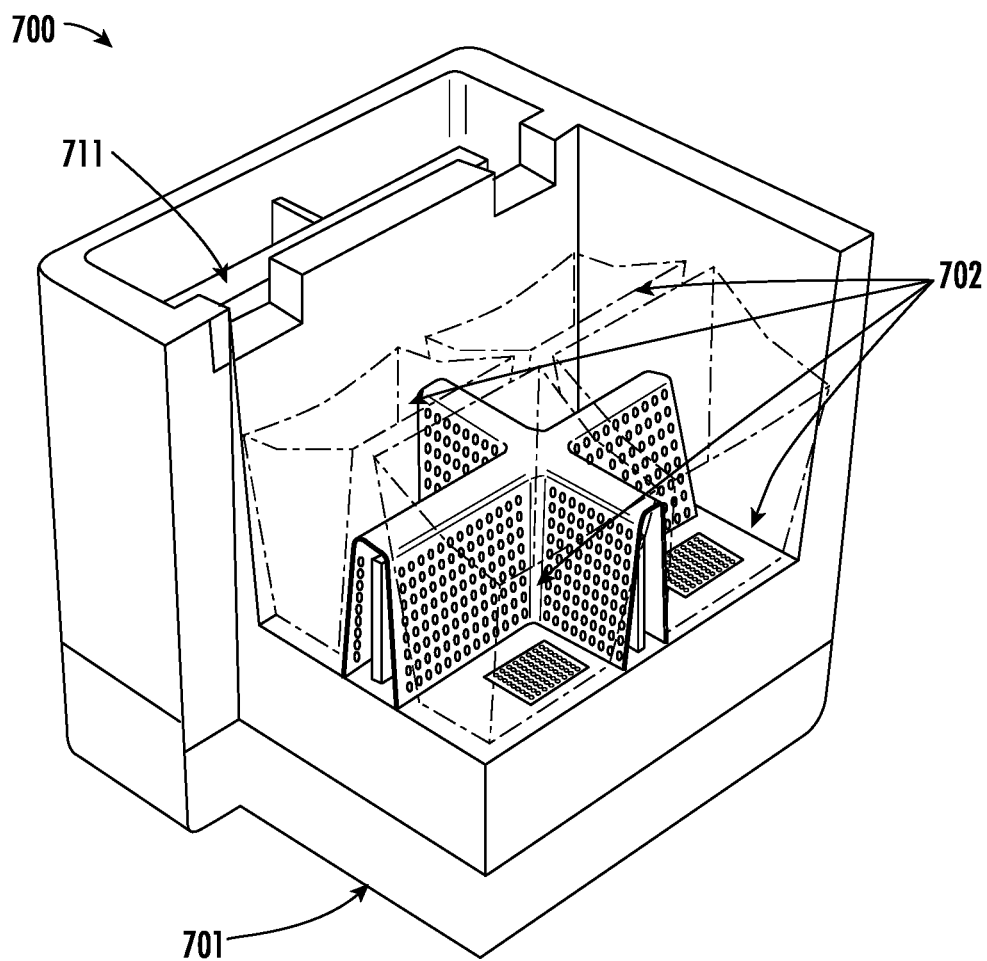
Figure 12B:
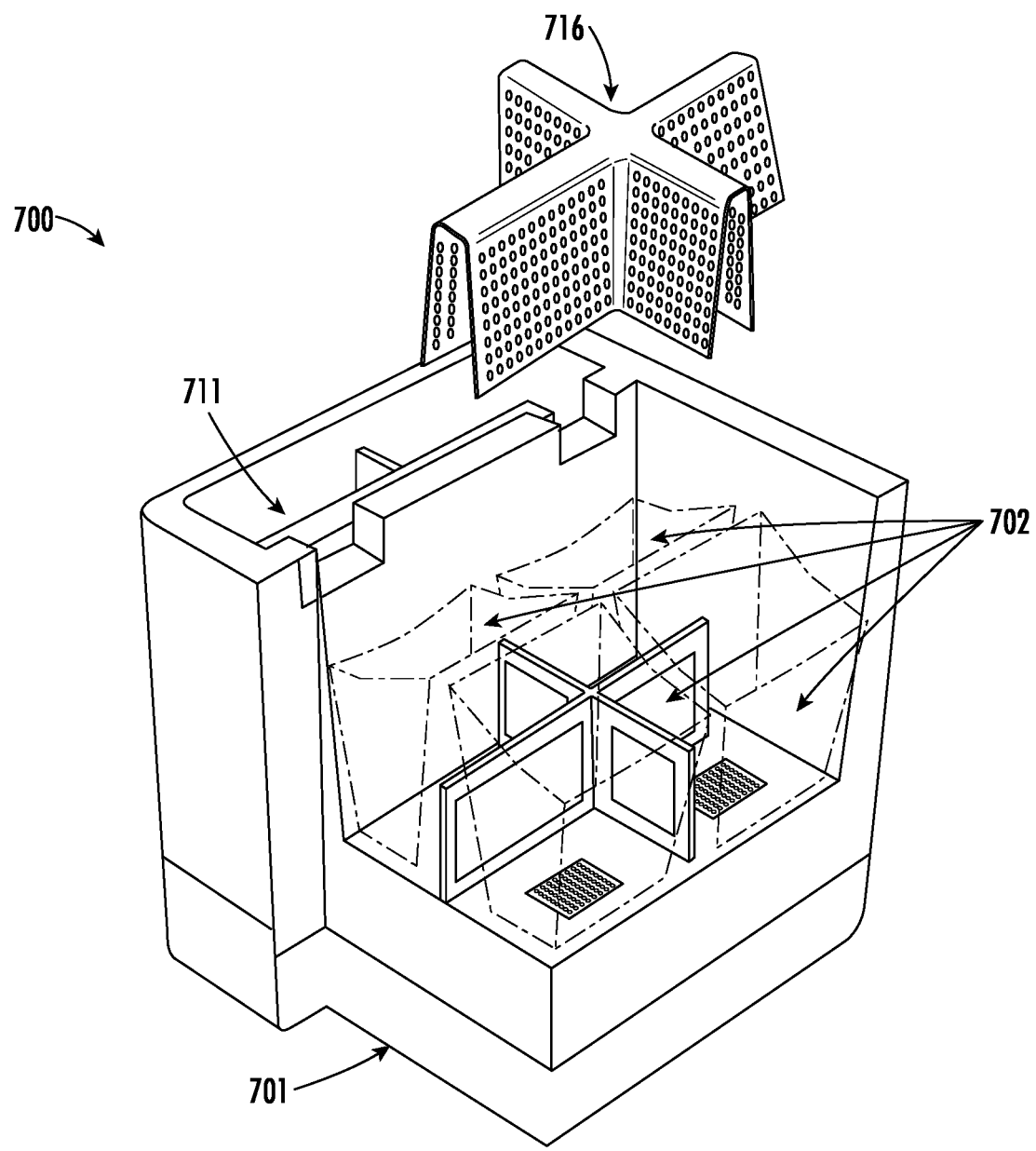

FIGS. 12A-12B illustrate a cross-sectional view of the food transportation system of FIGS. 10-11.

Figure 13A:
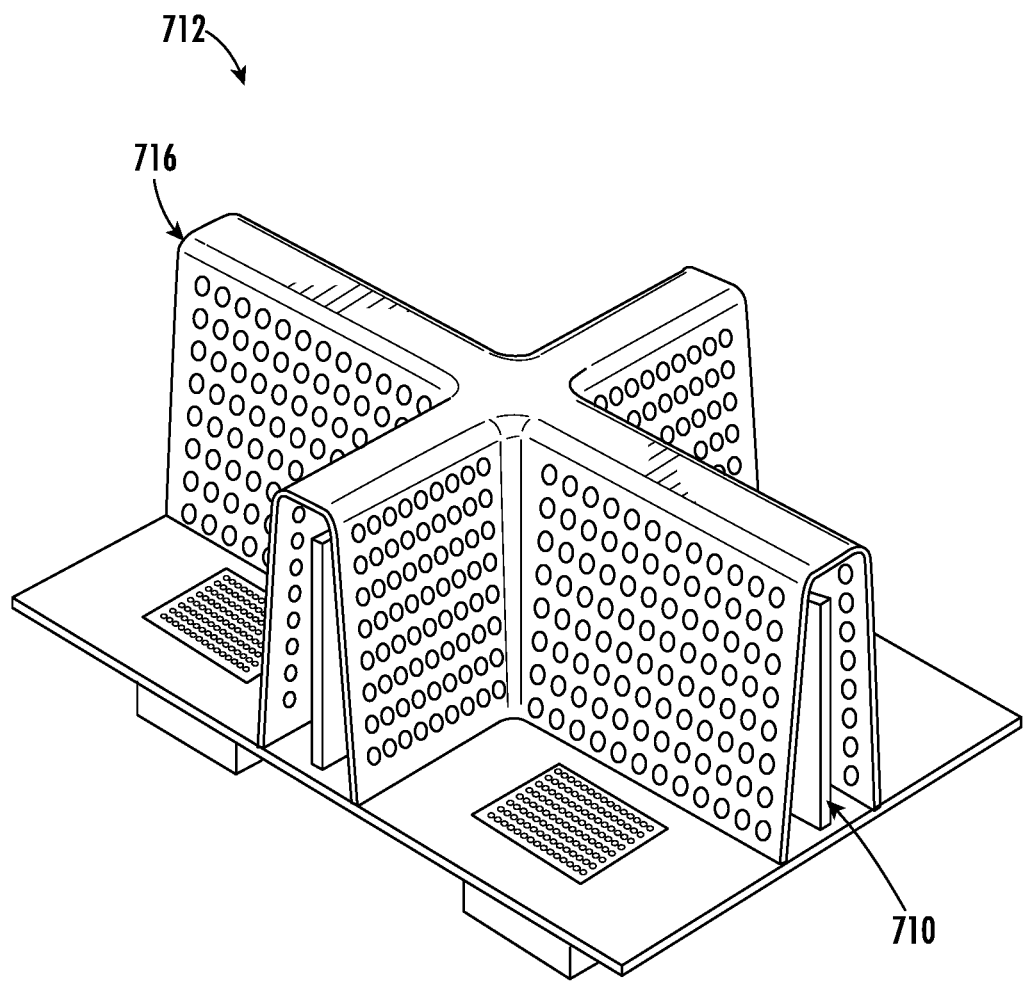
Figure 13B:
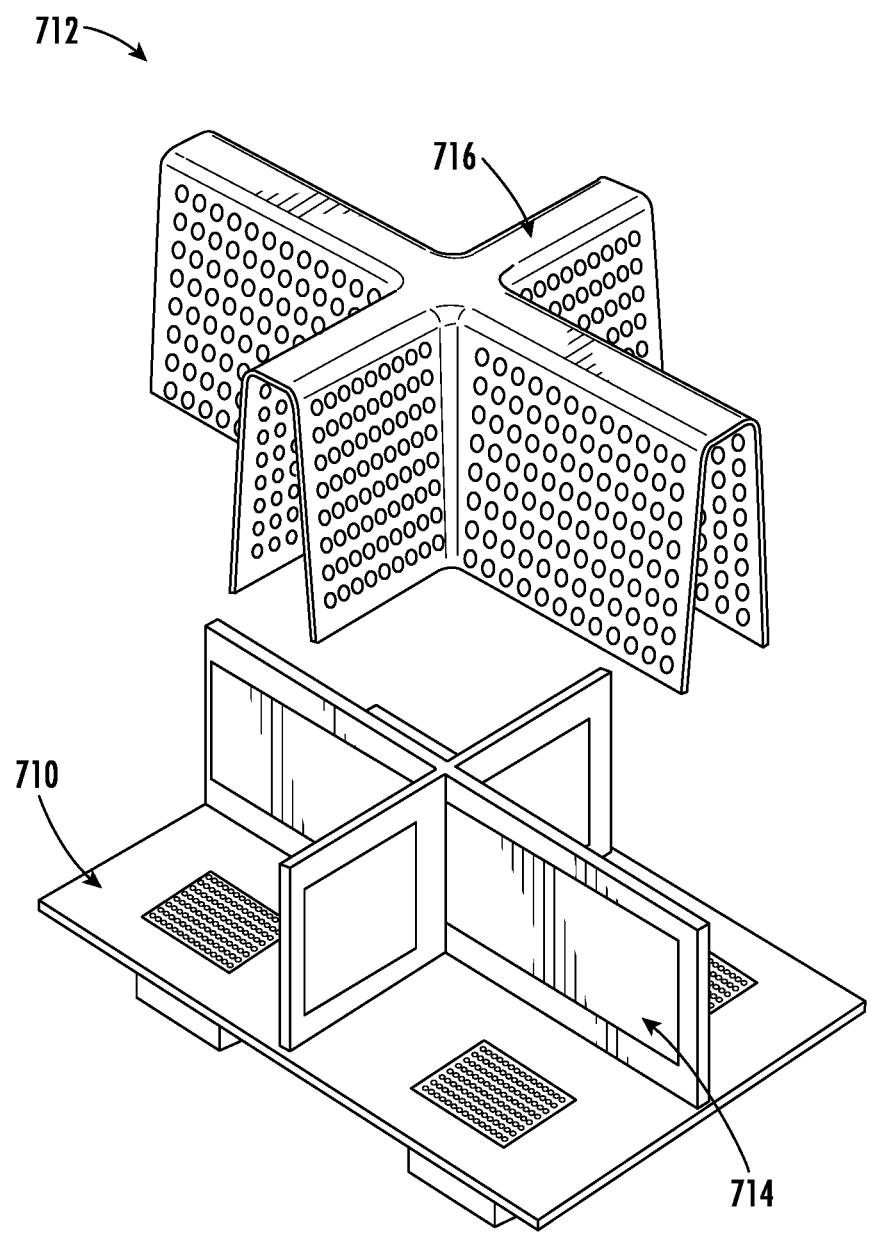

FIGS. 13A-13B illustrate a high heat system with film heating elements according to an example embodiment.

Figure 14:
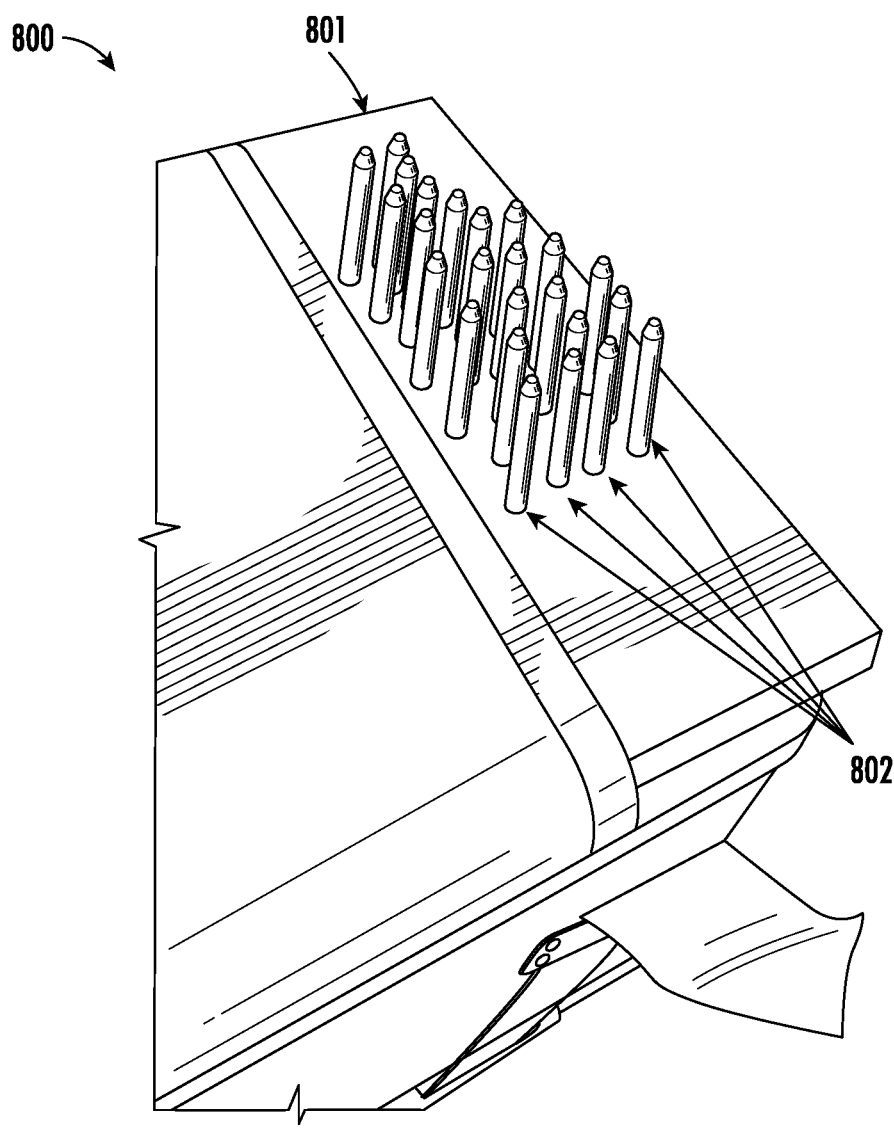

FIG. 14 illustrates an example food transportation system according to an example embodiment.

Figure 15:
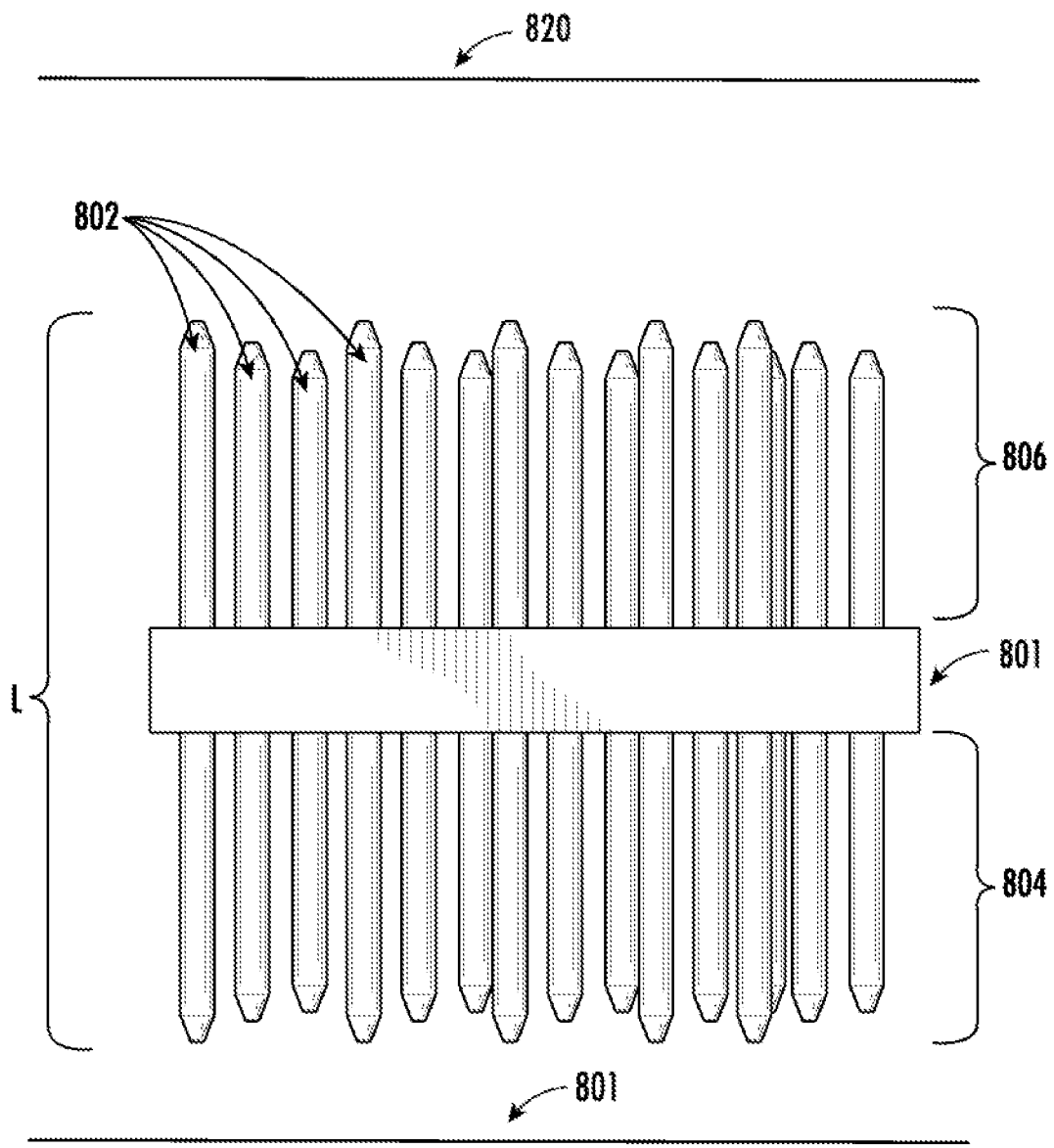
Figure 16:
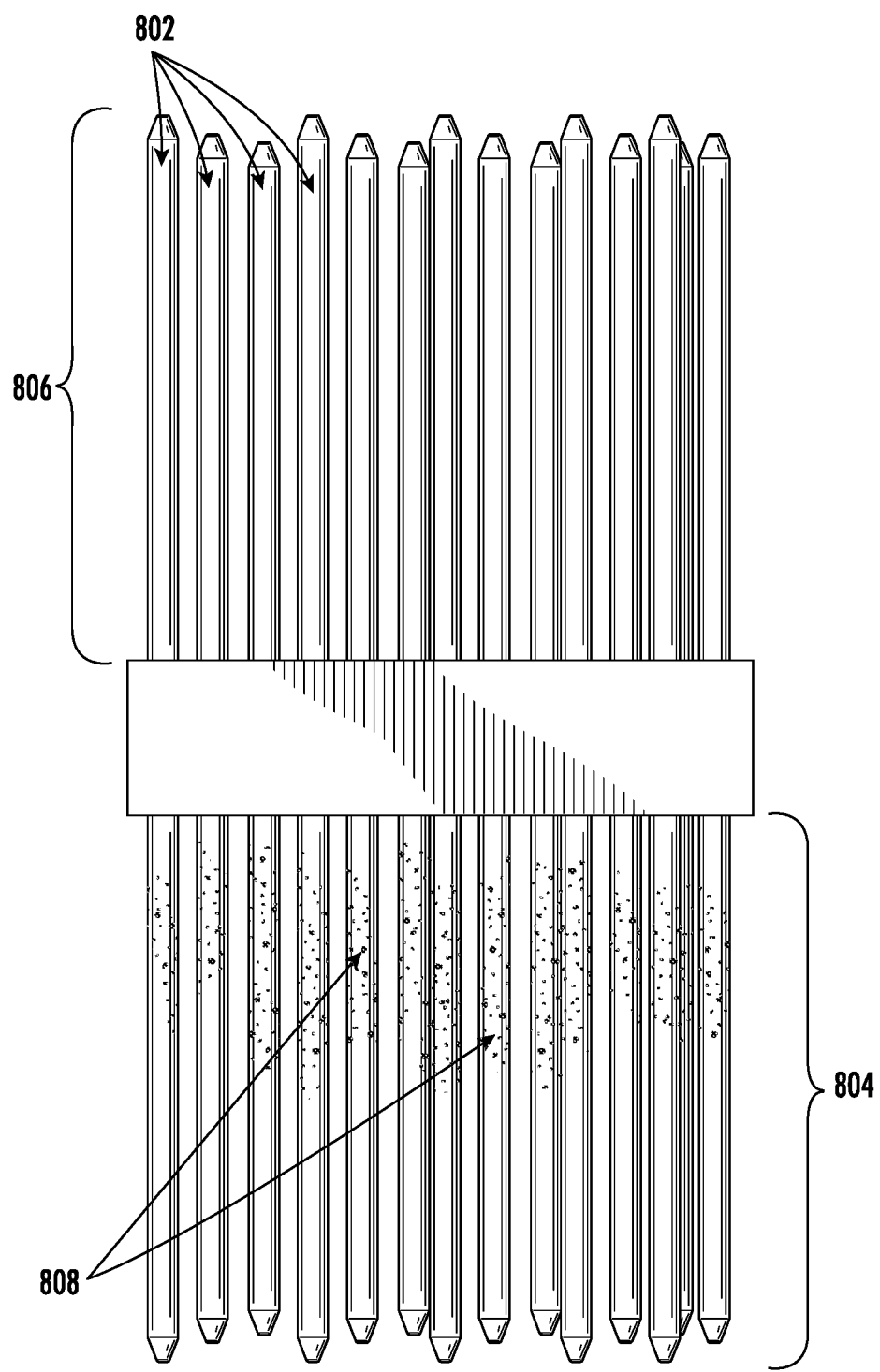

FIGS. 15-16 illustrate an example humidity control element including heat pipes according to an example embodiment.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements.

The terms "illustrative" and "exemplary" are used to be examples with no indication of quality level. As used herein, the terms "approximately," "generally," and "substantially" refer to within manufacturing and/or engineering design tolerances for the corresponding materials and/or elements as would be understood by the person of ordinary skill in the art, unless otherwise indicated.

As used herein, reference is made to the claimed modular humidity system for use in conjunction with a food item TMS. The present disclosure, however, contemplates that the modular humidity system of the present disclosure may be equally applicable to other devices where removing moisture and/or humidity is advantageous. Similarly, reference herein may be made to moisture-laden air in which at least a portion of the air within the described TMS and/or modular humidity control system includes a suspended fluid (e.g., water vapor, moisture, steam, or the like). Therefore, the amount of moisture within "moisture-laden air" and/or "air" as the terms are utilized herein may be dependent on the amount of water that evaporates from food within the TMS, the relative humidity of surrounding air, and/or the like. Thus, the terms "moisture-laden air" and "air" should not be read to limit the devices of the present disclosure to any particular quantity of suspended moisture or humidity. Like numbers refer to like elements throughout.

Overview

With reference to FIGS. 1-2, an example of a TMS 100 for use with food items is illustrated. As shown, the TMS 100 may define a housing or other enclosure in which one or more food items 102 may be supported. By way of example, the TMS 100 may define an insulated bag comprising a flexible, thermally insulating material defining an enclosure for enclosing food items therein. The enclosure may define an opening that may be selectably sealed via one or more fasteners (e.g., snaps, hook-and-loop fasteners, ties, and/or the like) to minimize the amount of air exchange between the interior of the enclosure and the surrounding environment when sealed. As just one example, the insulated bag may be defined by a structure formed of a high density thermal insulation for enclosing various food items 102 during transit. In some instances, a TMS 100 may include various racks, shelves, containers, etc. for supporting the one or more food items 102 therein. As would be evident to one of ordinary skill in the art in light of the present disclosure, the various food items 102 may also be independently enclosed (e.g., within pouches, bags, containers, or the like) within the TMS 100. By way of example, one or more food items 102 may be housed within food bags (e.g., as shown in FIGS. 8A-8B) so as to separate orders during delivery of the food items.

Additionally, a TMS 100 may include a heating element 104 configured to maintain the temperature of the various food items 102 within the TMS 100. In some embodiments, the heating element 104 may comprise a high heat capacity material so as to remain relatively hot during the transportation of the food items 102. In such an embodiment, the heating element 104 may be heated to a sufficient temperature prior to insertion within the TMS 100. By way of example, the heating element 104 may be placed in an oven (or other equivalent ambient heat source) and/or may include an integrated heater (e.g., that may be plugged into an external power source) configured to heat the heating element 104 to the requisite temperature. In some embodiments, the TMS 100 may include an integrated heater and associated fan system configured to circulate relatively warm air within the TMS 100 so as to warm (or otherwise maintain the heat of) the food items 102 therein. In some embodiments, the heating element 104 and associated temperature control system elements described herein may be located separate from the one or more humidity control system elements described herein.

As would be evident to one of ordinary skill in the art in light of the present disclosure, the humidity level (e.g., ratio of moisture within the air) within the TMS 100 may increase over time such that the food items 102 within the TMS 100 soften (e.g., become soggy) due to the moisture that may evaporate from the contained food items 102 enclosed within the enclosure (e.g., the moisture cannot escape the closed TMS 100). Said differently, the food items 102 may be inserted into the TMS 100 shortly after being prepared (e.g., following removal of the food items from an oven, a deep fryer, or the like) such that the food items 102 are at a desirable temperature for customer consumption. As the temperature of the food items 102 decreases over time (e.g., within the enclosed TMS 100), the moisture within or on the food items 102 may condense and increase the relative humidity within the TMS 100.

As such, various embodiments of the present invention provide for a modular humidity control system that, via fluid communication with the interior of the TMS 100, may be configured to reduce the relative humidity within the TMS 100. For example, a modular humidity control system of the present disclosure may, in some embodiments, be secured within (e.g., sewn in) a wall of the TMS 100. In other embodiments, the modular humidity control system may be attachable to an exterior surface of the TMS 100 so as to operate as a collection of modular components. Regardless of the configuration or orientation of the components described hereafter, the modular humidity control system of the present disclosure may be configured with an air inlet (e.g., which may be aligned with an air outlet of the TMS 100 when secured thereto) configured to accept moisture-laden air into the modular humidity control system from the interior of the TMS. Similarly, the modular humidity control system of the present disclosure may be configured such that an air outlet (e.g., which may be aligned with an air inlet of the TMS 100 when secured thereto) allows air to reenter the TMS from the modular humidity control system. By way of example, in some embodiments, the connection between modular humidity control system and the TMS 100 may be airtight such that the moisture-laden air entering the modular humidity control system via the air inlet does not escape to an ambient environment. In some embodiments, the TMS 100 may include a plate (e.g., a rigid plate such as a metal plate, a plastic plate, and/or the like) or equivalent structure (e.g., magnetic strip, airtight male-to-female connection, etc.) while the modular humidity control system includes a corresponding plate (e.g., a rigid plate having corresponding mating features to interact with the plate of the TMS 100) configured to mate with the TMS 100. While described with reference to mating plates, the present disclosure contemplates that any attachment mechanism of any material that provides sufficient protection from air leakage between the modular humidity control system and the TMS 100 may be used in the embodiments of the present disclosure.

According to at least one example embodiment described hereafter, the modular humidity control system may include a housing defining a closed circuit air flow path for circulating air through the TMS 100 attached thereto. In some embodiments, the modular humidity control system may include at least an air inlet and an air outlet, wherein the housing is configured to be attached to a TMS 100 such that the air inlet and the air outlet are in fluid communication with an interior of the TMS 100. The modular humidity control system may, in some embodiments, include a humidity sensor supported by the housing, and the humidity sensor may be configured to determine a relative humidity of the interior of the TMS 100. The relative humidity sensor may, in an instance in which the relative humidity within the TMS 100 satisfies a defined criteria (e.g., meets or exceeds a defined threshold), cause the moisture-laden air to enter the modular humidity control system (e.g., via a fan, positive pressure, or the like).

In an instance in which the relative humidity within the TMS 100 system satisfies the defined criteria, the modular humidity control system may force the moisture-laden air (e.g., received via the air inlet) into contact with a desiccant element supported by the housing of the modular humidity control system. In some embodiments, the desiccant element may include a perforated box (e.g., a porous bag, mesh bag, or equivalent structure supporting the desiccant material) such that moisture-laden air that is directed to the desiccant element may pass therethrough. In some embodiments, the desiccant element may be positioned and/or the continuous air flow path of moisture-laden air may be directed such that substantially all of the moisture-laden air is directed through the desiccant element. In other embodiments, the desiccant element may be positioned and/or the continuous air flow path of the moisture-laden air may be directed such that only a portion of the moisture-laden air passes through the desiccant element. In any event, the desiccant material may be configured to remove moisture (e.g., liquid) from the moisture-laden air directed therethrough. Said differently, the relative humidity of the air entering the desiccant elements is larger (e.g., more humid, contains more suspended moisture, etc.) than the air exiting the desiccant element. In some embodiments, this relatively dryer air is directed back into the TMS 100 via the air outlet of the modular humidity control system.

In some embodiments, the modular humidity control system may further be configured to adapt to the relative humidity within the TMS 100. For example, the modular humidity control system may, in some embodiments, include a proportional-integral-derivative (PID) controller configured to control the relative humidity of the air within the TMS 100 by monitoring data received by the PID controller from the relative humidity sensor described above and adjusting the air flow (e.g., via a fan, vent, or the like) into the modular humidity control system. Said differently, in an instance in which the data received by the PID controller from the relative humidity sensor indicates that the relative humidity within the TMS 100 exceeds a defined threshold, the PID may cause the air flow entering the modular humidity control system to increase (e.g., via increasing positive pressure within the TMS 100, increasing fan speed, etc.). In contrast, if the data received by the PID controller from the relative humidity sensor indicates that the relative humidity within the TMS 100 does not exceed a defined threshold, the PID controller may cause the air flow entering the modular humidity control system to slow or otherwise stop (e.g., halting operation of a fan or vent).

In some still further embodiments, the modular humidity control system of the present disclosure may include a regeneration system. As would be evident to one of ordinary skill in the art in light of the present disclosure, a desiccant material refers to a hygroscopic substance that may be configured to absorb fluid and is often used as drying or dehumidifying agent. Once a desiccant material is fully saturated (e.g., may no longer absorb any further fluid), the material may no longer successfully operate as a drying or dehumidifying agent. As such, the desiccant material may require heating in order to remove the fluid absorbed by the material (e.g., refreshed). In some embodiments, the modular humidity control system of the present disclosure includes one or more saturation sensors configured to determine the saturation of the desiccant element (e.g., generate saturation data). In an instance in which the desiccant material exceeds a saturation threshold, the modular humidity control system, and, in particular components of the regeneration system, may operate to force heated air through the desiccant element in order to remove the fluid absorbed by the desiccant element. In some embodiments, the modular humidity control system may further include a heat exchanger configured to iteratively cycle heat (e.g., the heated air directed through the desiccant element) back through the regeneration process until the desiccant material fails to exceed the saturation threshold (e.g., is sufficiently dry).

As would be evident to one of ordinary skill in the art in light of the present disclosure, the temperature of the food items 102 within the TMS 100 may decrease over time such that the food items 102 within the TMS 100 may cool (e.g., to an undesirable temperature for customer consumption) during transportation. As described above, the food items 102 may be inserted into the TMS 100 shortly after being prepared (e.g., following removal of the food items from an oven, a deep fryer, or the like) such that the food items 102 are at a desirable temperature for customer consumption. During transportation, however, heat from the food items 102 may dissipate from the food items 102 to the environment (e.g., the interior of the TMS 100 or otherwise). Furthermore, the TMS 100 may be opened and closed (e.g., so as to remove food items for delivery) such that heat within the TMS 100 is dissipated to an external environment of the TMS 100.

As such, according to at least one example embodiment described hereafter, the modular humidity control system may also include a temperature sensor supported by the housing configured to determine a temperature of the interior of the TMS 100 (e.g., and by association the temperature of the food items 102 therein). The temperature sensor may, in an instance in which the temperature within the TMS 100 fails to satisfy a defined criteria (e.g., fails to meet or exceed a defined threshold), cause the air within the TMS 100 to enter the modular humidity control system (e.g., via a fan, positive pressure, or the like). The temperature sensor may, in some embodiments, operate in conjunction with the humidity sensor described above to cause the air within the TMS 100 (moisture-laden or otherwise) to enter into the modular humidity control system. In other embodiments, the temperature sensor and associated temperature control elements may be located separate from the humidity control system elements.

In an instance in which the temperature within the TMS 100 system fails to satisfy the defined criteria, the modular humidity control system may force the air (e.g., received via the air inlet) into contact with a heating element supported by the housing of the modular humidity control system. The heating element may be configured to warm (e.g., impart heat) to the air directed therethrough such that warmer air may be directed back into the TMS 100 via the air outlet of the modular humidity control system.

In some embodiments described herein, the housing of the TMS 100 may define an air plenum (e.g., plenum space, plenum cavity, or the like) configured to house or otherwise enclose a portion of the warmer air around the interior of the TMS 100 (e.g., around the various food items 102). In order to reduce the heat lost to an external environment when the TMS 100 is opened to remove food items 102, the plenum in conjunction with the operation of the modular humidity control system (e.g., fans and the like) may be configured to halt circulation of air within the TMS 100 such that the relatively warmer air is retained within the interior of the TMS while the access door is in an open configuration.

Modular Humidity Control System

With continued reference to FIG. 2, a schematic diagram of a modular humidity control system 200 according to one example embodiment is illustrated. As shown, the modular humidity control system 200 may include an air inlet 202 and an air outlet 204. As described above, the air inlet 202 and the air outlet 204 may be configured to provide fluid communication between the modular humidity control system 200 and the TMS 100 so as to form a closed circuit air flow path for circulating air through the TMS 100. By way of example and as described more fully herein, the modular humidity control system 200 may receive moisture-laden air input (e.g., output from the TMS 100) into the closed circuit air flow path of the modular humidity control system 200. The closed circuit air flow path may be configured to direct at least a portion of this moisture-laden air (e.g., via the physical structure of the closed circuit air flow path or via the assistance of one or more fans) through the desiccant element 210 so as to remove moisture from the moisture-laden air. The closed circuit air flow path may be further configured to direct the relatively dryer air from the desiccant element 210 to one or more air outlets of the modular humidity control system 200 (e.g., input to the TMS 100). As such, the closed circuit air flow path formed by the modular humidity control system 200 may operate to circulate air through the food storage housing.

In some embodiments, the modular humidity control system 200 may include a separable housing configured to allow the modular humidity control system 200 to be removable from the TMS 100. In some other embodiments, the modular humidity control system 200 may be housed in whole or in part by the TMS 100 (e.g., sewn into a lining of an insulated bag). In some further embodiments, some components of the modular humidity control system 200 may be attached to the TMS 100, while the remaining elements are housed separately. For example, a desiccant material (e.g., desiccant element 210 described hereafter) may, in some embodiments, be housed by the TMS 100 while the remaining elements of the modular humidity control system 200 (e.g., vent, fan, PID controller, or the like) are housed as separate, modular components that are detachable from the TMS 100. By way of example, in some embodiments, a separate mobile device (e.g., phone, table, or the like) and/or other smart device may comprise the PID controller 208 or otherwise be configured to control operation of the TMS 100, PID controller 208, humidity sensor 206, or any combination thereof.

The modular humidity control system 200 may further include a humidity sensor 206. As described above, the humidity sensor 206 may be configured to determine a relative humidity of the interior of the TMS 100. As shown in FIG. 2, in some embodiments, the humidity sensor 206 may be located within a housing of the modular humidity control system 200 at the air inlet 202 (e.g., an air outlet of the TMS 100). In such an embodiment, the humidity sensor 206 may define one more electrodes that extend at least partially into the interior of the TMS 100 at the air inlet 202 so as to contact at least a portion of the moisture-laden air therein. The humidity sensor 206 may comprise a capacitive, resistive, or any other configuration of humidity sensing devices known in the art. Furthermore, while the humidity sensor 206 is shown at the air inlet 202, the present disclosure contemplates that the humidity sensor 206 may be located at any location within the modular humidity control system 200 so long as the humidity sensor 206 may contact air housed within the interior of the TMS 100. Similarly, in some embodiments, the humidity sensor 206 may be positioned within a separate opening in the housing of the modular humidity control system 200 (e.g., not positioned at the air inlet 202 nor at the air outlet 204) so long as sufficient contact with the interior of the TMS 100 is maintained.

In some further embodiments, the modular humidity control system 200 may include a humidity sensor (not shown) located at the air outlet 204 in addition to the humidity sensor 206 located at the air inlet 202. In such an embodiment, the humidity sensor at the air outlet 204 may be located so as to contact air housed within the interior of the TMS 100 proximate the air outlet 204. In this way, a difference between the relative humidity of the air within the TMS 100 proximate the air inlet 202 (e.g., determined via the humidity sensor 206) and the relative humidity of the air within the TMS 100 proximate the air outlet 204 (e.g., determined via the humidity sensor at the air outlet 204 (not shown)) may be calculated. This difference may be calculated via the PID controller 208 described hereafter in order to estimate the present capacity (e.g., level of saturation) of the desiccant material within the desiccant element 210 as also described more fully hereafter. For example, a relatively small difference value between the relative humidity readings may indicate that the desiccant material is more saturated while a relatively large difference value may indicate that the desiccant material is less saturated, and therefore capable of further use in reducing humidity levels within a TMS 100.

With continued reference to FIG. 2, in some embodiments, the modular humidity control system 200 may further include a PID controller 208 configured to receive data from the humidity sensor 206 (e.g., in electrical communication with the humidity sensor 206). The PID controller 208 of certain embodiments may be provided within a sealed compartment of the housing of the modular humidity control system 200, separate from air flow (and humidity) portions of the modular humidity control system 200. By keeping the PID controller 208 in the sealed compartment, electronic components associated with the PID controller 208 are isolated from humidity and moisture that may impede proper functionality of the PID controller 208.

By way of example, the PID controller 208, in operation, may receive data from the humidity sensor 206 corresponding to the relative humidity of the interior of the TMS 100. The PID controller 208 may monitor the relative humidity of the interior of the TMS 100 in order to determine if the relative humidity exceeds one or more defined humidity thresholds. By way of example, the humidity sensor 206 may iteratively determine the relative humidity of the interior of the TMS 100 and may transmit this data to the PID controller 208. The humidity sensor 206 may determine that the relative humidity within the interior of the TMS is approximately 25% (e.g., the air is 25% saturated with moisture) for a period of time during operation. The PID controller 208 may receive the data from the humidity sensor 206 indicating a 25% relative humidity, may compare this data to a defined 50% relative humidity threshold, and may determine that the data does not exceed the defined relative humidity threshold.

During operation, the relative humidity within the interior of the TMS 100 may increase (e.g., due to opening the TMS enclosure, via moisture within food items inserted therein evaporating, etc.) to a value of 65%. As noted above, the PID controller 208 may continuously monitor the data received from the humidity sensor 206, may compare this 65% relative humidity value to the defined 50% relative humidity threshold value, and may determine that the data exceeds the defined relative humidity threshold. In an instance in which the relative humidity exceeds the defined relative humidity threshold, the modular humidity control system 200 may force the moisture-laden air within the TMS 100 into the modular humidity control 200 as described hereafter. While described in reference to a defined relative humidity threshold, the present disclosure contemplates that, in some embodiments, the threshold relative humidity value may be varied by the PID controller 208 (e.g., or by user interaction) based upon the contents within the TMS 100.

The modular humidity control system 200 may further include one or more fans, vents, or the like (not shown) configured to force moisture-laden air into the modular humidity control system 200 from the TMS 100 via the air inlet 202. By way of example, in some embodiments, the modular humidity control system 200 may include one or more fans that, in operation, rotate to force air into the modular humidity control system 200 (e.g., the closed circuit air flow). As would be evident to one of ordinary skill in the art in light of the present disclosure, the one or more fans (not shown) may be located at any location within the modular humidity control system 200 so long as moisture-laden air may be directed through the desiccant element described hereafter. Said differently, the one or more fans (not shown) may be location proximate the air inlet 202 in order to blow air in a direction of the desiccant element and/or may be located proximate the air outlet 204 (e.g., downstream of the desiccant element 210) in order to suck air through the desiccant element 210. Similarly, in some embodiments, the modular humidity control system 200 may include a vent (not shown) configured to force air into the TMS 100 such that a positive pressure (e.g., relative the interior of the modular humidity control system 200) is generated. In this way, the positive pressure within the interior of the TMS 100 may drive the moisture-laden air into the modular humidity control system 200 via the air inlet 202.

With continued reference to FIG. 2, the modular humidity control system 200 may further comprise a desiccant element 210 secured within the closed circuit air flow path and configured to remove moisture from the moisture-laden passing through the modular humidity control system 200. As described above, the modular humidity control system 200 may define a closed circuit air flow path for circulating air through the food storage housing. In particular, the closed circuit air flow path may force moisture-laden air from the TMS 100 into the modular humidity control system 200 via one or more fans, vents, etc. such that the air contacts and/or substantially passes through the desiccant element 210. In some embodiments, the desiccant element 210 comprises a perforated box or other structure filled with a desiccant material. For example, the desiccant element 210 may comprise a perforated cube filled 4A Molecular Sieve (e.g., or any other suitable desiccant/absorbent material) such that at least some of the liquid suspended in the moisture-laden air directed through the perforated cube is removed from the air (e.g., is absorbed by the desiccant material). The air exiting the desiccant element 210 is directed by the modular humidity control system 200 into the TMS 100 via the air outlet 204. While described herein with reference to a perforated cube shaped desiccant element comprising 4A Molecular Sieve, the present disclosure contemplates that the desiccant element 210 may be dimensioned (e.g., sized and shaped) to accommodate any application regardless of geometric constraints.

While described herein with reference to a desiccant element 210 filled with a desiccant material, the present disclosure contemplates that other elements for removing moisture may be employed by the modular humidity control system 200 and TMS 100. In some alternative embodiments, the modular humidity control system 200 may include a condenser, Peltier (e.g., thermo-electric) dehumidifier, or the like in order to condense moisture suspended within the air of the TMS 100 as described hereafter with reference to FIGS. 10-13B. By way of example, the modular humidity control system 200 may be configured to induce a localized cold region (e.g., relative to the temperature within the TMS 100) so as to promote condensation of moisture within the TMS 100 (e.g., humid air). In such an embodiment, this localized region of relatively cooler temperature may be induced by a thermo-electric dehumidifier, and the liquid condensed from the moisture-laden air may be vented (e.g., via a one-way valve or the like) to an external environment of the TMS 100.

In this way, the modular humidity control system 200 of the present application operates to remove excessive moisture located within the TMS 100 such that the one or more food items 102 housed therein remain fresh during travel. Furthermore, by using a PID controller 208 in conjunction with the humidity sensor 206, the modular humidity control system 200 may optimize the relative humidity within the TMS 100 based upon the contents therein (e.g., food items). This iterative process of monitoring the relative humidity and adjusting the volume of moisture-laden air (e.g., via one or more fans, vents, or the like) directed through the desiccant element results in precise humidity adjustment not found in conventional devices.

Regeneration System

With reference to FIG. 3, a modular humidity control system and associated regeneration system 300 is illustrated. As shown, in some embodiments, the modular humidity control system 200 may be further configured (e.g., with the addition of components described hereafter) as a regeneration system 300. As shown, the regeneration system 300 may include the components of the modular humidity control system 200 (e.g., humidity sensor 206, PID controller 208, and/or desiccant element 210) as well as a heated air input 302, one or more saturation sensors 304, and/or a heat exchanger 306.

In some embodiments, as shown in FIG. 3, the modular humidity control system 200 may employ a regeneration system 300 so as to remove moisture from the desiccant element 210 such that the desiccant element 210 may be reused to remove moisture from moisture laden air directed therethrough. By way of example, the regeneration system 300 may include one or more saturation sensors 304 configured to monitor the amount of fluid received by the desiccant element 210 (e.g., removed from the moisture-laden air directed therethrough). In some embodiments, the one or more saturation sensors 304 may be mounted to a surface (e.g., interior or exterior) of the desiccant element 210 and configured to at least partially contact the desiccant material therein. For example, the one or more saturation sensors 304 may be mounted to an external surface of the desiccant element 210 and include one or more probes configured to extend at least partially into the interior of the desiccant element 210 to contact the desiccant material therein. In other embodiments, the one or more saturation sensors 304 may be mounted or otherwise supported by an internal surface of the desiccant element 210.

The data gathered by the one or more saturation sensors 304 (e.g., saturation data) may be transmitted to the humidity sensor 206 and/or the PID controller 208 (not shown). In some embodiments, the one or more saturation sensors 304 may be in direct electrical communication with the PID controller (not shown) while, in other embodiments, the data gathered by the one or more saturation sensors 304 may be transmitted to the humidity sensor 206 for directing to the PID controller (not shown). In other embodiments, the PID controller may be configured to monitor a number and/or duration of heating cycles applied to the desiccant material, and may be configured compare the number and/or duration of heating cycles against a defined dryness criteria. For example, upon determining that the number of heating cycles applied to the desiccant material exceeds a dryness threshold, the PID controller may end the regeneration process. Similarly, upon determining that the duration of the heating cycle applied to the desiccant material exceeds a threshold dryness duration, the PID controller may end the regeneration process.

The PID controller (not shown), or any other electronic component known in the art, may be configured to monitor the saturation of the desiccant element 210 in order to determine if the saturation exceeds one or more defined saturation thresholds. The one or more saturation sensors 304 may also iteratively determine the saturation percentage of the desiccant material within the desiccant element 210 and may transmit this data (e.g., saturation data) to the PID controller (not shown). By way of example, the one or more saturation sensors 304 may determine that the desiccant material is approximately 50% saturated for a period of time during operation. The PID controller 208 may compare the data received from the one or more saturation sensors indicating a 50% saturation percentage, may compare this data to a defined 90% saturation threshold, and determine that the data does not exceed the defined saturation threshold.

During operation, the saturation of the desiccant material within the desiccant element 210 may increase (e.g., due to the passing of moisture-laden air therethrough) to a saturation 95%. The PID controller (not shown) may continuously monitor the data received from the one or more saturation sensors 304, may compare this 95% saturation percentage value to the defined 90% saturation threshold value, and may determine that the data exceeds the defined saturation threshold. In an instance in which the saturation exceeds the defined saturation threshold, the regeneration system 300 may force a heated air input 302 through the desiccant element 210 as described hereafter. While described in reference to a defined saturation threshold, the present disclosure contemplates that, in some embodiments, the saturation threshold may be varied by the PID controller (e.g., or by user interaction) based upon the application of the modular humidity control system 200 and associated regeneration system 300.

In an instance in which the saturation of the desiccant material within the desiccant element 210 exceeds the defined saturation threshold, the regeneration system may force the heated air input 302 through the desiccant element 210 in order to refresh the desiccant material (e.g., refresh the desiccant element 210). As would be evident to one of ordinary skill in the art in light of the present disclosure, a desiccant material may be regenerated, recharged, reused, refreshed, etc. by substantially drying the desiccant material such that the liquid moisture absorbed therein is removed. As shown in FIG. 3, as the heated air input 302 passes through the desiccant element 210, the one or more saturation sensors 304 may iteratively receive data indicative of the saturation percentage of the desiccant material (e.g., saturation data) contained therein and provide the data to the PID controller (not shown). In an instance in which the PID controller (not shown) determines that the saturation percentage of the desiccant material within the desiccant element 210 indicates that the desiccant material is sufficiently refreshed (e.g., via comparison with one or more refresh thresholds, by containing substantially no fluid moisture therein, etc.) the PID controller (not shown) may cause the heated air input 302 to cease.

In some embodiments, the modular humidity control system 200 and associated regeneration system 300 may further including a heating element (not shown) in the desiccant element 210 or otherwise configured to heat the desiccant element 210. Said differently, the heating element (not shown) may be formed as part of the desiccant element 210 or may be located anywhere within the modular humidity control system 200 so long as heat from the heating element (not shown) may be used to regenerate the desiccant material of the desiccant element 210 as described hereafter.

In an instance in which the saturation of the desiccant material within the desiccant element 210 exceeds the defined saturation threshold, the regeneration system 300 may be configured to power the heating element (e.g., turn on) so as to sufficiently warm the desiccant element 210 in order to refresh the desiccant material (e.g., refresh the desiccant element 210). As described above, the desiccant material may be regenerated, recharged, reused, refreshed, etc. by substantially drying the desiccant material such that the liquid moisture absorbed therein is removed. In such an embodiment, as the heating element operates to dry (e.g., via supplying sufficient heat to evaporate the water contained therein) the desiccant material, the one or more saturation sensors 304 may iteratively receive data indicative of the saturation percentage of the desiccant material (e.g., saturation data) contained therein and provide the data to the PID controller (not shown). In an instance in which the PID controller (not shown) determines that the saturation percentage of the desiccant material within the desiccant element 210 indicates that the desiccant material is sufficiently refreshed (e.g., via comparison with one or more refresh thresholds, by containing substantially no fluid moisture therein, etc.) the PID controller (not shown) may remove the power input (e.g., turn off) to the heating element (not shown).

In some embodiments, as shown in FIG. 3, the regeneration system 300 may further include a heat exchanger 306 located downstream of the desiccant element 210 configured to iteratively cycle heat (e.g., the heated air input 302 directed through the desiccant element) back through the regeneration process until the desiccant material fails to exceed the saturation threshold (e.g., is sufficiently dry). By way of example, the heat exchanger 306 may be used to reheat the air exiting the desiccant element 210 and may recirculate the reheated air for passing through the desiccant element 210. In some embodiments, the PID controller (not shown), the humidity sensor 206, and/or the one or more saturation sensors may be in electrical communication with a corresponding electronic component of the heat exchanger (not shown) so as to control the operation thereof. Said differently, the iterative monitoring processes described above may further be used to direct the operation of the heat exchanger such that, in an instance in which the desiccant material is unsaturated or dry, the PID controller (not shown) halts the recirculation operation of the heat exchanger 306. In this way, the regeneration system 300 of the present application may operate to reduce the downtime of the modular humidity control system 200 (e.g., instances in which the desiccant material of the desiccant element 210 is full saturated).

In other embodiments, the modular humidity control system 200, or at least a portion thereof, may be placed within a drying oven to dry the desiccant material. In certain embodiments, the entirety of the modular humidity control system 200 may be placed within a drying oven to recharge the desiccant material by heating the desiccant material to remove moisture therefrom. In other embodiments, the desiccant element 210 may be removable from the modular humidity control system 200 such that the desiccant element 210 may be placed within a drying oven to recharge the included desiccant.

Example Implementation

With reference to FIGS. 4-6B, an example modular humidity control system 200 is illustrated. As shown in FIGS. 4-5, the modular humidity control system 200 may include a control portion 400 (e.g., housing a user interface 401 including a display and interactive user elements (e.g., buttons), the PID controller 208, one or more sensors, fans, and/or the like), as well as one or more and, in some embodiments, may be detachably secured to the exterior of a TMS 100 via a receiver 402. In some embodiments, the exterior of the TMS 100 may define a receiver 402 such that the modular humidity control system 200 may be at least partially inserted within the receiver 402 to position the modular humidity control system 200 to enable fluid communication between the interior of the TMS 100 and the elements of the modular humidity control system 200 described above (e.g., humidity sensor 206, desiccant element 210, etc.) for example, by aligning the respective inlets and outlets of the TMS 100 and modular humidity control system 200. In this way, efficient removal of the modular humidity control system 200 is provided such that the modular humidity control system 200 (e.g., in whole or in part) may be removed from the TMS 100 without modification of the TMS 100. While illustrated in conjunction with a receiver 402 in FIGS. 4-5, the present disclosure contemplates that the modular humidity control system 200 may be secured or otherwise attached to the TMS 100 via any known attachment methods in the art such that the modular humidity control system 200 may be detachable from the TMS 100.

With reference to FIGS. 6A-6B, the modular humidity control system 200 including a control portion 400 is illustrated detached from the TMS 100. As shown in FIG. 6B, the control portion 400 may further be detachable from the modular humidity control system 200 such that the desiccant element 210 or any other component may be replaced. In some embodiments, the control portion 400 may, in operation in which the modular humidity control system 200 is received by the TMS 100, be configured to illustrate a temperature reading of the interior of the TMS 100, a relative humidity reading of the interior of the TMS 100 (e.g., at various locations as described above), and/or a desiccant capacity percentage (e.g., a saturation percentage reading) of the desiccant element 210. In particular, in some embodiments, the PID controller 208 may receive electrical signals from one or more of the humidity sensors 206, the saturation sensor(s) 204, or the like and may calculate various system parameters based upon these electrical signals (e.g., relative humidity, temperature, saturation percentage, etc.) The PID controller 208 may further be in electrical communication with the control portion 400 such that the PID controller 208 may transmit instructions for displaying the calculated system parameters for viewing by a user via the control portion 400.

As would be evident to one of ordinary skill in the art in light of the present disclosure, the control portion 400 (e.g., or associated housing supporting said control portion 400) may house some or all of the electrical components described herein (e.g., the PID controller 208). By way of example, the housing of the control portion 400 may include the PID control 208 and/or humidity sensor 206, while the desiccant element 210 may be housed separately from the housing of the control portion 400. In this way the desiccant material of the desiccant element 210 may be easily removable from the modular humidity control system 200 such that the desiccant element 210 may be refreshed separately from the electrical components described above.

As shown in FIG. 6B, in some embodiments, the desiccant elements 210 may include one or more inlet/outlet openings 403 (e.g., vents or the like). As shown, these inlet/outlet openings 403 may be configured to provide fluid communication between the desiccant element 210 (e.g., the desiccant material housed within the desiccant element 210) and the interior of the TMS 100. In some embodiments, the inlet/outlet openings 403 may be coupled to corresponding air inlets/outlets of the TMS 100. In this way, moisture-laden air may enter some or all of the inlet/outlet openings 403 in order to contact the desiccant material housed therein. As would be evident to one of ordinary skill in the art in light of the present disclosure, the operation of the inlet/outlet openings 403 as an opening to inlet air into the desiccant element 210 or as an opening to outlet air from the desiccant element 210 may be determined by the air flow design (e.g., via one or more fans, positive pressure, or the like as described above) of the TMS 100 or associated elements of the modular humidity control system 200. As such, in some embodiments, a portion of the inlet/outlet openings 403 may operate as inlets while another portion of the inlet/outlet openings 403 may operate as outlets. In other embodiments, the inlet/outlet openings 403 may all operate as inlet openings for a period of time in which air is directed into the desiccant elements 210 and may subsequently all operate as outlet openings after the suspended moisture within the air is extracted (via saturation) by the desiccant material of the desiccant element 210.

Heat Preservation

With reference to FIG. 7, a schematic diagram of a modular humidity control system 200 including heat preservation is illustrated. As describe above with reference to FIG. 2, the modular humidity control system 200 may include an air inlet 202 and an air outlet 204 that provide fluid communication between the modular humidity control system 200 and the TMS 100. Alternatively or in addition to the humidity sensor 206 and the desiccant element 210, the system 200 may include one or more temperature sensors 502 configured to determine the temperature of the interior of the TMS 100 (and by association the temperature of the food items 102 housed therein). As shown in FIG. 7, in some embodiments, the temperature sensor 502 may be located within a housing of the modular humidity control system 200 at the air inlet 202 (e.g., an air outlet of the TMS 100). In other embodiments, the temperature sensors 502 and heating system 504 may be located separate from the closed circuit air flow path of the modular humidity control system 200.

In such an embodiment, the temperature sensor 502 may define one more electrodes that extend at least partially into the interior of the TMS 100 at the air inlet 202 so as to contact at least a portion of the air therein. The temperature sensor 502 may comprise a capacitive, resistive, thermocouple, thermistor, thermometer, or any other configuration of temperature sensing devices known in the art. Furthermore, while the temperature sensor 500 is shown at the air inlet 202, the present disclosure contemplates that the temperature sensor 502 may be located at any location within the modular humidity control system 200 so long as the temperature sensor 502 may contact air housed within the interior of the TMS 100. In some embodiments, the temperature sensor 502 may be positioned with the humidity sensor 206 or the humidity sensor 206 and the temperature sensor 502 may be formed as a single element.

In some further embodiments, the modular humidity control system 200 may include one or more temperature sensors (not shown) located at the air outlet 204 in addition or alternative to the one or more temperature sensors 502 located at the air inlet 202. In such an embodiment, the temperature sensor at the air outlet 204 may be located so as to contact air housed within the interior of the TMS 100 proximate the air outlet 204. In this way, a difference between the temperature of the air entering the system 200 from the TMS 100 (e.g., via the air inlet 202) and the temperature of the air exiting the system 200 into the TMS 100 (e.g., via the air outlet 204) may be calculated. This difference may be calculated via the PID controller 208 described above and may be used in conjunction with the independent temperature readings of the one or more temperature sensors 502 in order to maintain the temperature of the food items 102 within the TMS 100 (e.g., via varying airflow, imparted heat, etc.).

As described above with reference to FIG. 2, the PID controller 208 may also be configured to receive data from the temperature sensor 502 (e.g., in electrical communication with the temperature sensor 502). By way of example, the PID controller 208, in operation, may receive data from the temperature sensor 502 corresponding to the temperature of the interior of the TMS 100. The PID controller 208 may monitor the temperature of the interior of the TMS 100 in order to determine if the temperature fails to satisfy one or more defined temperature thresholds (e.g., a temperature drop below an acceptable level). By way of example, the temperature sensor 502 may iteratively determine the temperature of the interior of the TMS 100 and may transmit this data to the PID controller 208. The temperature sensor 502 may determine that the temperature within the interior of the TMS is approximately 120° F. for a period of time during operation. The PID controller 208 may receive the data from the temperature sensor 502 indicating a 120° F. temperature, may compare this data to a defined 110° F. minimum temperature threshold, and may determine that the data satisfies the defined temperature threshold.

During operation, the temperature within the interior of the TMS 100 may decrease (e.g., due to opening the TMS enclosure or the like) to a value of 80° F. As noted above, the PID controller 208 may continuously monitor the data received from the temperature sensor 502, may compare this 80° F. temperature value to the 110° F. minimum temperature threshold value, and may determine that the data fails to satisfy the defined temperature threshold. In an instance in which the temperature fails to exceed the defined temperature threshold, the modular humidity control system 200 may force the air within the TMS 100 (moisture-laden or otherwise) into the modular humidity control 200 as described hereafter. While described in reference to a defined temperature threshold, the present disclosure contemplates that, in some embodiments, the threshold temperature value may be varied by the PID controller 208 (e.g., or by user interaction) based upon the contents within the TMS 100. As describe in detail above, the modular humidity control system 200 may further include one or more fans, vents, or the like (not shown) configured to force air into the modular humidity control system 200 from the TMS 100 via the air inlet 202.

With continued reference to FIG. 7, in some embodiments, the modular humidity control system 200 may further comprise a heating system 504 configured to warm (or otherwise impart heat to) the air directed therethrough such that warmer air may be directed back into the TMS 100. As would be evident to one of ordinary skill in the art in light of the present disclosure, the modular humidity control system 200 may force air (moisture-laden or otherwise) from the TMS 100 into the modular humidity control system 200 via one or more fans, vents, etc. such that the air contacts and/or substantially passes through the heating system 504 and is warmed (e.g., via conduction, convection, radiation, etc.). In some embodiments, the heating system 504 may comprise a low voltage heater configured to transfer heat to the air so as to warm the air passing therethrough.

While described herein with reference to a low voltage heater, the present disclosure contemplates that any heating system may be employed to warm the air in the system 200. As described above, the heating system 504 may also comprise a power element (e.g., battery or the like) or may be in electrical communication with one or more power sources (not shown) of the TMS 100 or separate from the TMS 100. The air exiting the heating system 504 may be directed by the modular humidity control system 200 into the TMS 100 via the air outlet 204. As described hereafter with reference to FIGS. 8A-8B, the air entering the TMS 100 via the air outlet 204 may, in some embodiments, enter or otherwise pass through a plenum structure 500. As would be evident to one of ordinary skill in the art in light of the present disclosure, the temperature sensor 502, PID controller 208, and heating system 504 may be configured to vary the temperature provided to the interior of the TMS 100 by modifying the speed at which air passes through the system 200, by modifying the temperature of the heating system 504, or the like so as to control the temperature within the TMS 100.

While illustrated and described with reference to a system 200 that includes humidity and temperature control, the present disclosure contemplates that the heat preservation features (e.g., temperature sensor 502, heating system 504, plenum structure 500) of the modular humidity control system 200 may exist separate from the humidity control system 200 and may be housed in whole or in part by the TMS 100 (e.g., sewn into a lining of an insulated bag). Said differently, the heat perseveration of the present disclosure may exist, in some embodiments, without the desiccant element 210 and humidity sensors 206. In some further embodiments, some components of the modular humidity control system 200 may be attached to the TMS 100, while the remaining elements are housed separately. For example, elements of the modular humidity control system 200 (e.g., vent, fan, PID controller, or the like) may be housed as separate, modular components that are detachable from the TMS 100.

With reference to FIGS. 8A-8B, a perspective and a cross-sectional side view, respectively, of the modular humidity control system with heat preservation of FIG. 7 are illustrated. As described above, in some embodiments, the housing of the TMS 100 may define an air plenum 500 (e.g., plenum space, plenum cavity, or the like) configured to house or otherwise retain a portion of the warmer air around the interior of the TMS 100 (e.g., around the various food items 102). As shown, in some embodiments, the relatively warmer air may exit the modular humidity control system 200 via the air outlet 204 into the side walls of the TMS 100 housing (e.g., the plenum 500). The interior surface of the plenum 500 (e.g., contacting the interior of the TMS 100) may be perforated (or otherwise define openings such that air may pass therebetween) such that air received within the side walls of the TMS 100 housing (e.g., the plenum 500) may circulate into the interior of the TMS and warm (e.g., transfer heat to) the various food items 102 housed therein. The opposing side walls of the TMS 100 (e.g., the plenum 500) may be similarly perforated such that air may enter these opposing side walls and be directed into the modular humidity control system 200 via the air inlet 202. As described above, the system 200 may define one or more fans (e.g., vents or the like) to drive circulation of the air within the TMS 100 and modular humidity control system 200. While illustrated with opposing side walls defining an air plenum configuration, the present disclosure contemplates that any number of the side walls of the TMS 100 may define an air plenum 500 based upon the intended application of the TMS 100.

As described above and illustrated in FIGS. 8A-8B, in some embodiments, the various food items 102 may also be independently enclosed (e.g., within pouches, bags, containers, or the like) within the TMS 100. For example, one or more food items 102 may be housed within food bags so as to separate orders during delivery of the food items 102. In some instances, the food bags within the TMS 100 (e.g., surrounded in whole or in part by the plenum 500) may also be perforated (or otherwise define openings) so as to facilitate the transfer of heat and/or humidity (e.g., moisture) between the food items 102 and the air within the TMS 100.

In some embodiments, the modular humidity control system 200 may be configured only to circulate air (e.g., warm and dry air) through the interior of the TMS 100 in an instance in which the access door 506 substantially seals the interior of the TMS 100 from the external environment. Said differently, in order to reduce or otherwise prevent unnecessary leakage of air and heat to an external environment of the TMS 100, the modular humidity control system 200 (e.g., the fans, vents, or the like) may halt in an instance in which the access door 506 is opened. As described above, in order to reduce the heat lost to an external environment when the TMS 100 is opened to remove food items 102, the plenum 500 in conjunction with the operation of the modular humidity control system (e.g., fans and the like) may be configured to halt circulation of air within the TMS 100 such that the relatively warmer air remains at least partially housed (e.g., retained) within the plenum 500 of the TMS 100. By way of example, the fans and vents of the modular humidity control system may stop circulation of the air within the system such that the relatively warm air within the side walls (e.g., the plenum 500) of the TMS 100 is retained while the access door 506 is in an open configuration. In this way, the TMS 100 may be configured to prevent excessive escape of warm air while also influencing (e.g., warming) the food items 102 within the TMS 100 (e.g., via conduction or physical contact with the TMS 100).

In order to identify an instance in which the interior of the TMS 100 is open to an external environment, the access door 506 and/or housing of the TMS 100 may, in some embodiments, comprise contact switches, magnetic connections, limit switches, electromagnetic relays, mechanical latches, or the like. By way of example, the access door 506 may define a contact switch and the housing of the TMS 100 may define a corresponding contact switch configured to mate with (e.g., electronically or mechanically connect) the contact switch of the access door 506. Each of the contact switches may be in electrical communication with the PID controller 208 or other computing element of the TMS 100 or modular humidity control system 200. In an instance in which the access door 506 is closed to seal the interior of the TMS 100 and contacts the walls of the TMS 100 housing, a circuit may be completed indicating to the PID controller 208 that the access door 506 is closed. The PID controller 208 may then operate the heating element 504, fans (not shown), and the desiccant element 210 so as to circulate air (e.g., warm and dry air) through the TMS 100. Similarly, in an instance in which the access door 506 is opened, contact between the access door 506 and the walls of the TMS 100 may break so as to break (e.g. open) the circuit. The PID controller 208 may then halt operation of the heating element 504, fans (not shown), and the desiccant element 210 so as to prevent unnecessary leakage of air to the external environment.

While described herein with reference to an example contact switch, the present disclosure contemplates that any detection systems or elements known in the art may also be used. By way of example, the access door 506 and/or housing of the TMS 100 may include a light sensor (e.g., optical sensor, photoelectron sensor, photo sensor, or the like) configured to identify an instance in which the interior of the TMS 100 is open to an external environment.

With reference to FIG. 9, an example umbilical connection system 600 for use with the modular humidity control system 200 embodiments is illustrated. As described above, in some embodiments, one or more components of the modular humidity control system 200 may be formed as modular components and/or be housed separate from the TMS 100. By way of example, the modular humidity control system 200 may define one or more power sources (not shown) that are formed separate from the TMS 100. In such an embodiment, the umbilical connection system 600 may operate to provide electrical communication between the modular humidity control system 200 and the power source (not shown). In other embodiments, the modular humidity control system 200 may house the humidity sensors 206, the temperature sensors 502, and the desiccant element 210. In such an embodiment, the PID controller 208 and the one or more fans (not shown) may be connected via the umbilical connection system 600 so as to establish electrical communication between the PID controller 208 and the sensors and/or fluid communication between the fans (not shown) and the interior of the TMS 100.

In some alternative embodiments, the umbilical connection system 600 may comprise the PID controller 208 and/or other computing elements configured to control operation of a plurality of TMSs 100 and associated modular humidity control systems 200. By way of example, the umbilical connection system 600 may define a plurality of umbilical connections each configured to mate with one or more modular humidity control systems 200 and TMSs 100. In such an embodiment, a centralized computing element or PID controller 208 may monitor the temperature and relative humidity within the interior of each TMS in communication with the umbilical connection system 600. Based upon this monitoring, the centralized computing element of the umbilical connection system 600 may be configured to control the respective air flow, heating systems 504, desiccant elements 210, etc. so as to independently provide the desired temperature and relative humidity to each TMS 100 based upon the contents of the respective TMS 100.

In any embodiment, humidity and temperature data generated by the humidity sensors 206, the temperature sensors 502, and/or the PID controller 208 may be used to sense whether food items are present in the TMS 100. The food items located within the TMS 100 operate as humidity sources in that moisture is inputted to the air by these food items. In some embodiments, the monitoring of the relative humidity within the TMS 100 by the components described herein may operate to identify the presence of food items within the TMS 100. Said differently, if the relative humidity within the TMS 100 remains below one or more humidity thresholds, the PID controller 208 or other equivalent elements may determine that food items are not located within the TMS 100. Similarly, if the relative humidity within the TMS 100 is above one or more humidity thresholds, the PID controller 208 or other equivalent elements may determine that food items are present within the TMS 100. The PID controller 208 may also monitor and analyze the overall change and rate of change for the relative humidity. If a sharp increase in humidity is sensed, the PID controller 208 may infer that a food item has just been placed in the TMS 100. Similarly, if a sharp decrease is sensed, the PID controller 208 may infer that a food item has just been removed from the TMS 100. The times of these sharp increases and decreases can be used to estimate the total time that a food item is within the TMS 100, which can be used to ensure that a maximum hold time (as may be determined by empirical testing) is not exceeded.

The humidity and temperature data may be further used to improve the overall operation of the TMS 100. In particular, the PID controller 208, a centralized computing element, or the like may monitor and analyze the overall change and rate of change for the relative humidity and temperate within the TMS 100. Based upon this analysis, the TMS 100 may control the desiccant element 210, the temperature sensors 206, the humidity sensors 502, the PID controller 208, or the like so as to optimize the quality of the food items within the TMS 100 over time.

Humidity Control Element

With reference to FIGS. 10-13B, a food transportation system (e.g., system 700) is illustrated. As shown, the system 700 may define a housing or other enclosure in which one or more food items 702 may be supported. As described above, the various food items 702 may also be independently enclosed (e.g., within pouches, bags, containers, or the like) within the system 700. By way of example, one or more food items 702 may be housed within perforated food cartons so as to separate orders during delivery of the food items 702 while also facilitating the transfer of heat and/or humidity (e.g., moisture) between the food items 102 and the air within the system 700. The system 700 may further include a heating system 704 configured to warm (or otherwise impart heat to) the air within the housing. The system 700 may circulate air (moisture-laden or otherwise) within the housing via one or more fans 708, vents, etc. such that the air substantially passes thereby or sufficiently contacts the heating system 704 and is warmed (e.g., via conduction, convection, radiation, etc.). In some embodiments, as illustrated in FIG. 10, the one or more fans 708 may be positioned in a side wall of the housing of the system 700. In other embodiments, however, the one or more fans may be centrally located (not shown) in the bottom of the housing of the system 700 (e.g., vertically below the food items 102).

In some embodiments, the heating system 704 may comprise a low voltage heater configured to transfer heat to the air so as to warm the air passing thereby. In some embodiments, the heating system 704 may be disposed within one or more walls of the housing of the system 700. In order to control operation of the heating system 704, fans 708, sensors, or other electrical components described herein, the system 700 may include a circuitry housing 701. The circuitry housing 701 may be configured to enclose or otherwise support various controllers or computing devices as described above (e.g., PID controller 208) as well as house various power sources, batteries, etc. configured to power operation of the elements described herein.

The system 700 further includes a humidity control element 710 secured within the closed circuit air flow path and configured to condense moisture from the moisture-laden air passing through the closed circuit air flow path (e.g., the interior of the housing). As described above, the system 700 may include a condenser, Peltier (e.g., thermo-electric) dehumidifier, or the like in order to condense moisture suspended within the air of the system 700. As described hereafter, the humidity control element 710 may, in some instances, comprise a frozen fluid (e.g., an ice pack or the like) configured to induce a localized cold region (e.g., relative to the temperature within the interior of the housing) so as to promote condensation of moisture within the system 700 (e.g., humid air). In such an embodiment, the liquid condensed from the moisture-laden air may be vented (e.g., via a one-way valve or the like) to an external environment of the system 700. In other embodiments, the system 700 may include a condensation collector 711 configured to receive fluid condensed from the moisture-laden air by the humidity control element 710. In some further embodiments, the condensation collector 711 may include fluid sensors configured to generate condensation data indicative of the fluid level within the condensation collector 711

Although illustrated in FIG. 10-13B as a single integral system 700, the present disclosure contemplates that one or more elements of the humidity control system (e.g., humidity control element 710 and condensation collector 711) may be formed as modular components. Said differently, the humidity control element 710 and condensation collection 711 may be housed in detachable housings such that these elements may be removably attached to an external surface of a food storage housing as described above with reference to FIGS. 1-7.

As shown in FIG. 11, air may circulate within the interior of the system 700 via operation of the fans 708. During circulation, the air within the interior of the system 700 may be heated by the heating system 704 while also receiving moisture condensed by the one or more food items 102 within the interior of the system 700. In order to reduce the humidity within the system, the closed circuit air flow path may circulate air, as facilitated by the fans 708, into contact with the humidity control element 710. The humidity control element 710 may, due to the temperature difference between the moisture-laden air and the humidity control element 710 (e.g., an ice pack or the like), condense the fluid suspended within the moisture-laden air so as to reduce the relative humidity within the interior of the system 700.

As the liquid condenses, the condensation collector 711 that may house the humidity control element 710 may collect this liquid. In some embodiments, the access door 706 described hereafter may be opened and the humidity control element 710 and the condensation collector 711 may be removed and/or replaced. In some instances, the liquid within the condensation collector 711 may be removed and the humidity control element 710 may be replaced (e.g., with a new ice pack or the like). By way of example, a delivery employee may user the system 700 to transmit food items (e.g., fries, chicken sandwiches, etc.) from one location to another. Following completion of delivery, the employee may remove the humidity control element 710 (e.g., a sufficiently warm ice pack) and replace the humidity control element 710 (e.g., with a new frozen ice pack). Although described herein with reference to an ice pack of frozen fluid, the present disclosure contemplates that the humidity control element 710 may further include a desiccant element/material or a Peltier dehumidification element as described above. For example, the humidity control element 710 may include a Peltier plate, Peltier heat pump, solid state refrigerator, thermoelectric cooler (TEC), or any equivalent device configured to utilize the Peltier effect. Said differently, the humidity control device 710 may be configured to create a heat flux at the junction of two different materials resulting in a localized cooler region within the system 700. As moisture-laden air contacts the Peltier dehumidification element, moisture may condense from the air.

As described above with reference to FIGS. 8A-8B, the system 700 may also be configured only to circulate air (e.g., warm and dry air) through the interior of the system 700 in an instance in which the access door 706 substantially seals the interior of the system 700 from the external environment. In order to identify an instance in which the interior of the system 700 is open to an external environment, the access door 706 and/or housing of the system 700 may, in some embodiments, comprise contact switches, magnetic connections, limit switches, electromagnetic relays, mechanical latches, or the like. As described above, the access door 706 may define a contact switch and the housing of the system 700 may define a corresponding contact switch configured to mate with (e.g., electronically or mechanically connect) the contact switch of the access door 706. Each of the contact switches may be in electrical communication with a computing element of the system 700. In an instance in which the access door 706 is closed to seal the interior of the system 700, a circuit may be completed indicating that the access door 706 is closed. The computing element may then operate the heating system 704 and fans 708. In an instance in which the access door 706 is opened, contact between the access door 706 and the walls of the system 700 may break so as to break (e.g. open) the circuit. The computing element may then halt operation of the heating system 704 and fans 708.

With reference to FIGS. 12A-13B, an example high heat system 712 is illustrated. In some delivery applications, the food items 702 within the system 700 may require additional heat in order to remain at an appropriate temperature (e.g., for customer satisfaction, food safety, or the like). As such, the system 700 may, in some embodiments, include a high heat system 712. As shown, the high heat system 712 may include a plurality of film heating elements 714 configured to generate heat proximate one or more food items within the interior of the system 700. The film heating elements 714 may operate as electrical resistance heating in which a substrate film is coated or printed with resistance material such that, when electrical current is applied, the film heating elements 714 generate heat. As shown, the plurality of film heating elements 714 may be positioned within the interior of the system 700 housing so as to divide the interior of the housing into heating areas. By way of example, the plurality of film heating elements 714 may divide the interior of the housing of the system 700 into quadrants each configured to receive a food item package as shown in FIGS. 12A-12B. In order to shield the food items 702 from excessive contact (e.g., direct contact with the film heating elements 714), the high heat system 712 may include a perforated grill 716 configured to enclose the plurality of film heating elements 714.

With reference to FIGS. 14-16, a food transportation system 800 (e.g., system 800) is illustrated. As shown, the system 800 may include similar elements and features to system 700 described above with reference to FIGS. 10-13B. In the embodiments of FIGS. 14-16, however, the system 800 may include one or more heat pipe(s) 802 as a humidity control element(s). The heat pipe(s) 802 (e.g., humidity control element(s)) may be supported by a portion of the housing 801 of the system 800 and may, as shown in FIGS. 15-16, extend at least partially into the interior of the housing 801. For example, the heat pipe(s) 802 may extend into the closed circuit air flow path as described above and may be configured to condense moisture from the moisture-laden air passing through the closed circuit air flow path (e.g., the interior of the housing 801).

With reference to FIG. 15, an example heat pipe 802 may be formed as an elongate member defining a first portion 804 that extends into the closed circuit air flow path (e.g., the interior of the housing 801). The heat pipe 802 may further define a second portion 806 opposite the first portion 804 that extends at least partially into an ambient environment of the housing 801. Due to the elevated temperature of the one or more food items of the system 800, the heat generated by, for example, the heating system 704 described above, or the like, the first portion 804 of the heat pipe 802 may have a temperature that is greater than (e.g., relatively warmer than) the temperature of the second portion 806 of the heat pipe 802. Said differently, the temperature of the second portion 806 may be lower (e.g., relatively colder than) the temperature of the first portion 804 due to the lower temperature of the ambient environment. This temperature differential between the first portion 804 and the second portion 806 of the heat pipe 802 may be such that the heat pipe 802 operates as a heat transfer device so as to induce a localized cold region within the closed circuit air flow path (e.g., the interior of the housing 801 of the system 800).

By way of example, in some embodiments, the heat pipe 802 may operate a heat-transfer device in which a liquid (e.g., a working fluid) may be housed by the body of the heat pipe 802. As described above, the first portion 804 may be subjected to a relatively warmer environment such that the temperature of the first portion 804 is greater than that of the temperature of the second portion 806. As such, the working fluid located within the first portion 804 may receive heat from the relatively warmer moisture-laden air within the closed circuit air flow path (e.g., the interior of the housing 801). The absorption of heat at the first portion 804 may cause the liquid (e.g., working fluid) within the first portion 804 to change states from liquid to vapor, and the removal of heat at the first portion 804 may reduce the temperature of the surface of the first portion 804 (e.g., in thermal engagement with the closed circuit air flow) relative to the temperature of the moisture-laden air within the housing 801. Said differently, the first portion 804 may operate as an evaporator. Due to the temperature differential along the length L of the heat pipe 802, the vapor may move along the length L to the second portion 806 (e.g., the lower temperature or relatively cooler portion).

As described above, the second portion 806 may be, for example, exposed to an ambient environment of the food storage housing (e.g., an exterior environment of the system 800) such that the temperature of the second portion 806 is lower than the temperature of the first portion 804. As such, when the vapor reaches the second portion 806, the vapor may return to a fluid state, and the temperature of the surface of the second portion 806 may increase (e.g., releasing latent heat energy). Said differently, the second portion 806 may operate as a condenser and, by association with an external environment, as a heat sink. Upon condensing the vapor into a liquid state, the liquid (e.g., working fluid) may return to the first portion 804. In order to promote this recirculation of the fluid to the first portion 804, the heat pipe 802 may employ capillary action (e.g. a wick structure), centrifugal force, gravity, or the like. Although described hereinafter with reference to an elongate body operating as the heat pipe 802, the present disclosure contemplates that the heat pipe 802 (e.g., humidity control element) may include constant conductance heat pipes, vapor chambers, variable conductance heat pipes, pressure controlled heat pipes, diode heat pipes, thermosyphons, rotating heat pipes, and/or the like.

With reference to FIG. 16, the operation of the heat pipe 802 described above in which the heat is absorbed by the heat pipe 802 at the first portion 804 (e.g., converting the state of the working fluid from liquid to vapor) may reduce the relative temperature of the surface of the first portion 804 relative the temperature of the moisture-laden air within the housing 801. By way of example, one or more food items 702 may be housed within perforated food cartons to facilitate the transfer of heat and/or humidity (e.g. moisture) between the food items 702 and the air within the system 800, and a heating system 704 may be used to adequately warm the one or more food items 702 to maintain the temperature of the one or more food items above a defined temperature threshold as described above. The increased temperature required to maintain the temperature of the one or more food items 702 may similarly increase the dew point (e.g., the temperature, for a particular pressure and humidity, below which liquid may condense) of the moisture-laden air within the system 800. Said differently, so long as the temperature of the first portion 804 of the heat pipe 802 remains below the dew point temperature, contact between the moisture-laden air and the first portion 804 may result in the condensing of fluid 808 from the moisture-laden air on a surface of the first portion 804.

In some embodiments, the temperature of the interior of the food storage housing may be maintained, by the heating system 704 or otherwise, between approximately 175° F. and approximately 185° F. Furthermore, the humidity control elements of the present disclosure (e.g., desiccant elements, ice packs, heat pipes, features configured to induce localized cold regions, and/or any device configured to condense moisture from moisture-laden air) may be configured to, in some embodiments, maintain the relative humidity of the food storage container between approximately 30% and approximately 40%. Additionally, as described above with reference to FIG. 11, the system 800 may include one or more fans 708 configured to circulate air within the closed circuit air flow path and into contact with the humidity control element (e.g., heat pipe(s) 802). In some embodiments, the one or more fans 708 may be configured to generate an airflow of approximately 49.4 cubic feet per minute (CFM). Although described herein with reference to an airflow, relative humidity, and temperature maintained by the food storage housing, the present disclosure contemplates that one or more of these operating parameters may be varied based upon the intended application of the system 800.

By way of a particular, non-limiting example, if the container housing the one or more food items is maintained at a temperature of 175° F. with 32% relative humidity and ambient pressure, the dew point temperature may be approximately 120° F. If the first portion 804 of the heat pipe 802 is below 120° F., moisture (e.g., water vapor, suspended fluid, steam, or the like) of the moisture-laden air is condensed as fluid 808 on a surface of the first portion 804. This condensing of liquid from the moisture-laden air may operate to reduce the relative humidity of the air within the system 800 to improve the freshness of the one or more food items 702 of the system 800. Although described herein with reference to a particular dew point temperature for a defined temperature, humidity, and pressure, the present disclosure contemplates that the dew point temperature may vary based upon the intended application of the system 800 (e.g., due to varying the operating temperature, airflow velocity, relative humidity, air pressure, and/or the like).

As shown in FIGS. 14-16, the first portion 804 of the heat pipe 802 may be positioned within the interior of system housing 801 such that the first portion 804 contacts the moisture-laden air (e.g., consistent contact). In some embodiments, however, the housing 801 may define one or more containers, housings, enclosures, or the like configured to selectively expose the first portion 804 of the heat pipe 802 to the moisture laden-air. Additionally, the second portion 806 of the heat pipe 802 is illustrated in FIGS. 14-16 contacting an ambient environment of the food storage housing 801 that is an external environment of the system 800. In some embodiments, however, the second portion 806 of the heat pipe 802 may be positioned in a separate housing, enclosure 820, etc. that is maintained at a temperature that is less than that of the temperature of the first portion 804. Said differently, the present disclosure contemplates that the ambient environment may comprise any environment at which the temperature of the second portion 806 may be lower than the temperature of the first portion 804.

Although the heat pipe(s) 802 are illustrated as elongate members positioned substantially parallel with respect to at least one surface of the housing 801 (e.g., the surface supporting the heat pipe(s) 802), the present disclosure contemplates that the heat pipe(s) 802 may be dimensioned (e.g., sized and shaped) based upon the intended application of the modular humidity control system and associated food transportation system 800. For example, the present disclosure contemplates that the length, width, cross-sectional area, and/or any other dimension of the heat pipe(s) 802 may be varied to increase or decrease the amount of moisture condensed from the moisture-laden air within the system 800. Furthermore, the present disclosure contemplates that the working fluid (e.g., water, ammonia, ethanol, methanol, etc.) and heat pipe material (e.g., copper, aluminum, stainless steel, or the like) may also be varied to modify the efficiency of the heat pipe(s) 802 heat transfer and/or the amount of condensation provide by the heat pipe(s) 802.

In some embodiments, the dimensions (e.g., size and shape), the position, and/or the orientation of the heat pipe(s) 802 may be such that the second portion 806 is passively cooled. Said differently, the heat pipe(s) 802 may be configured such that the heat dissipated by the second portion 806 without active cooling elements is sufficient to maintain the heat difference between the second portion 806 and the first portion 804 as described above. In other embodiments, the system 800 may include or more active cooling elements (e.g., a fan, thermo-electric cooler, solid-state refrigerator, ice pack, and/or the like) to maintain this temperature differential (i.e., by actively cooling the second portion 806). Furthermore, the present disclosure contemplates that the body supporting the heat pipe(s) 802 may be formed as a modular component such that the heat pipe(s) 802 may be removed from the system 800 so as to, for example, add or remove heat pipe(s) 802 to adjust to humidity control provided by the heat pipe(s) 802 (e.g., humidity control element(s)).

In some embodiments, the system 800 may further include a condensation collector configured to receive fluid condensed from the moisture-laden air by the first portion 804 of the heat pipe 802 (e.g., the humidity control element). As described above with reference to FIGS. 10-12B, the condensation collection (e.g., collector 711 in FIG. 11) may be positioned below the first portion 804 of the heat pipe 802. The condensation collector may, for example, span the entirety of the bottom of the container housing the one or more food items 702 or only a portion thereof (e.g., a portion corresponding to the position(s) of the heat pipe(s) 802). In some embodiments, a duct, channel, or other fluid flow device (not shown) may be positioned proximate the first portion 804 of the heat pipe 802 so as to direct the fluid condensed on the surface of the first portion 804 to the condensation collector. The condensation collector may be removably attached to the housing 801 as described above such that the fluid condensed from the moisture-laden air may be emptied from the system 800 by a user or otherwise.

Although described herein with reference to an example heat pipe, in some embodiments as illustrated in FIGS. 14-16, the humidity control element may include a plurality of heat pipes 802 configured to collectively condense moisture from the moisture-laden air passing through the closed circuit air flow path. Each of the plurality of heat pipes 802 may similarly define a first portion 804 that extends into the closed circuit air flow path and a second portion 806 opposite the first portion 804 that extends at least partially into an ambient environment of the food storage housing 801. Although the plurality of heat pipes 802 are illustrated as having a uniform size and shape, the present disclosure contemplates that each heat pipe 802 from amongst the plurality of heat pipes may be individually dimensioned (e.g., sized and shaped), positioned, and/or oriented based upon the intended application of the system 800.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A food transportation system comprising:
   a food storage housing defining an interior configured to house one or more food items, the food storage housing defining at least in part a closed circuit air flow path for circulating air through the food storage housing; and
   a humidity control element supported by the food storage housing and thermally coupled with the closed circuit air flow path, wherein the humidity control element comprises a heat pipe, wherein the heat pipe comprises a wick structure, wherein the heat pipe defines a first portion and a second portion opposite the first portion, wherein the first portion of the heat pipe extends into the closed circuit air flow path and is configured to condense moisture from the moisture-laden air passing through the closed circuit air flow path, and wherein the second portion of the heat pipe extends at least partially into an enclosure distinct from the interior of the food storage housing, the second portion of the heat pipe exposed to an external environment of the food storage housing.

2. The food transportation system according to claim 1, wherein the first portion defines a first temperature, and the second portion defines a second temperature, wherein the second temperature is lower than the first temperature.

3. The food transportation system according to claim 2, wherein the first portion is configured to contact the moisture-laden air such that the moisture is condensed as fluid on a surface of the first portion.

4. The food transportation system according to claim 1, further comprising a condensation collector supported by the food storage housing configured to receive fluid condensed from the moisture-laden air by the first portion of the heat pipe.

5. The food transportation system according to claim 4, wherein the condensation collector is removable from the food storage housing.

6. The food transportation system according to claim 1, wherein the humidity control element is removably attached to the food storage housing.

7. The food transportation system according to claim 1, where the humidity control element comprises a plurality of heat pipes.

8. The food transportation system according to claim 7, wherein each of the plurality of heat pipes defines:

a first portion that extends into the closed circuit air flow path; and a second portion opposite the first portion that extends at least partially into the enclosure distinct from the interior of the food storage housing, wherein the second portion is exposed to the external environment of the food storage housing.

9. The food transportation system according to claim 7, wherein each of the plurality of heat pipes comprises a wick structure.

10. The food transportation system according to claim 1, wherein the heat pipe extends vertically from a top surface of the food storage housing.

11. The food transportation system according to claim 7, wherein at least one of the heat pipes of the plurality of heat pipes extends vertically from a top surface of the food storage housing.

* * * * *